Sept. 26, 1944.  I. B. HOROWITZ  2,359,267
POWER TRANSMISSION
Filed July 2, 1941                    9 Sheets-Sheet 1
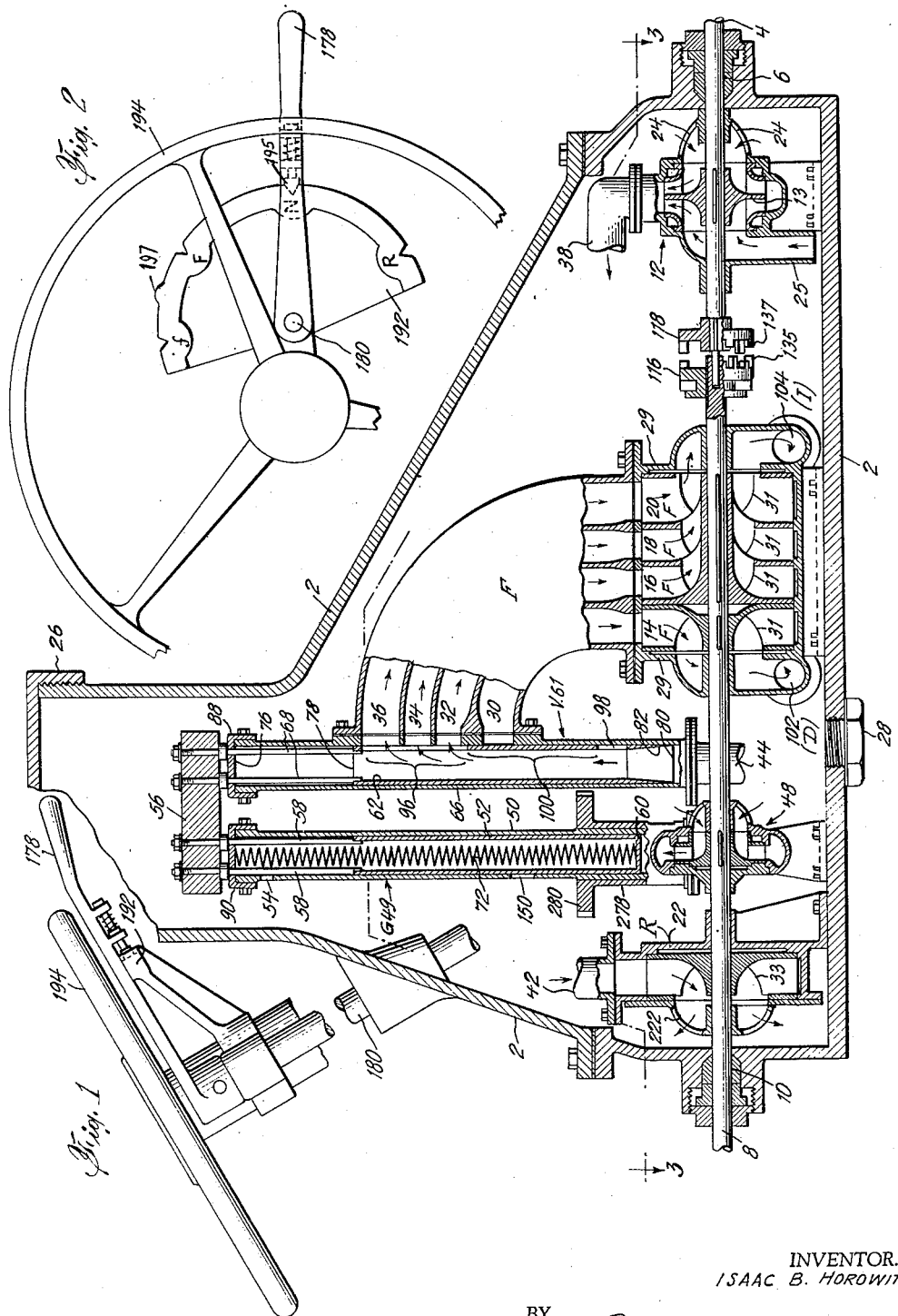
INVENTOR.
ISAAC B. HOROWITZ
BY August Bostroem
HIS ATTORNEY

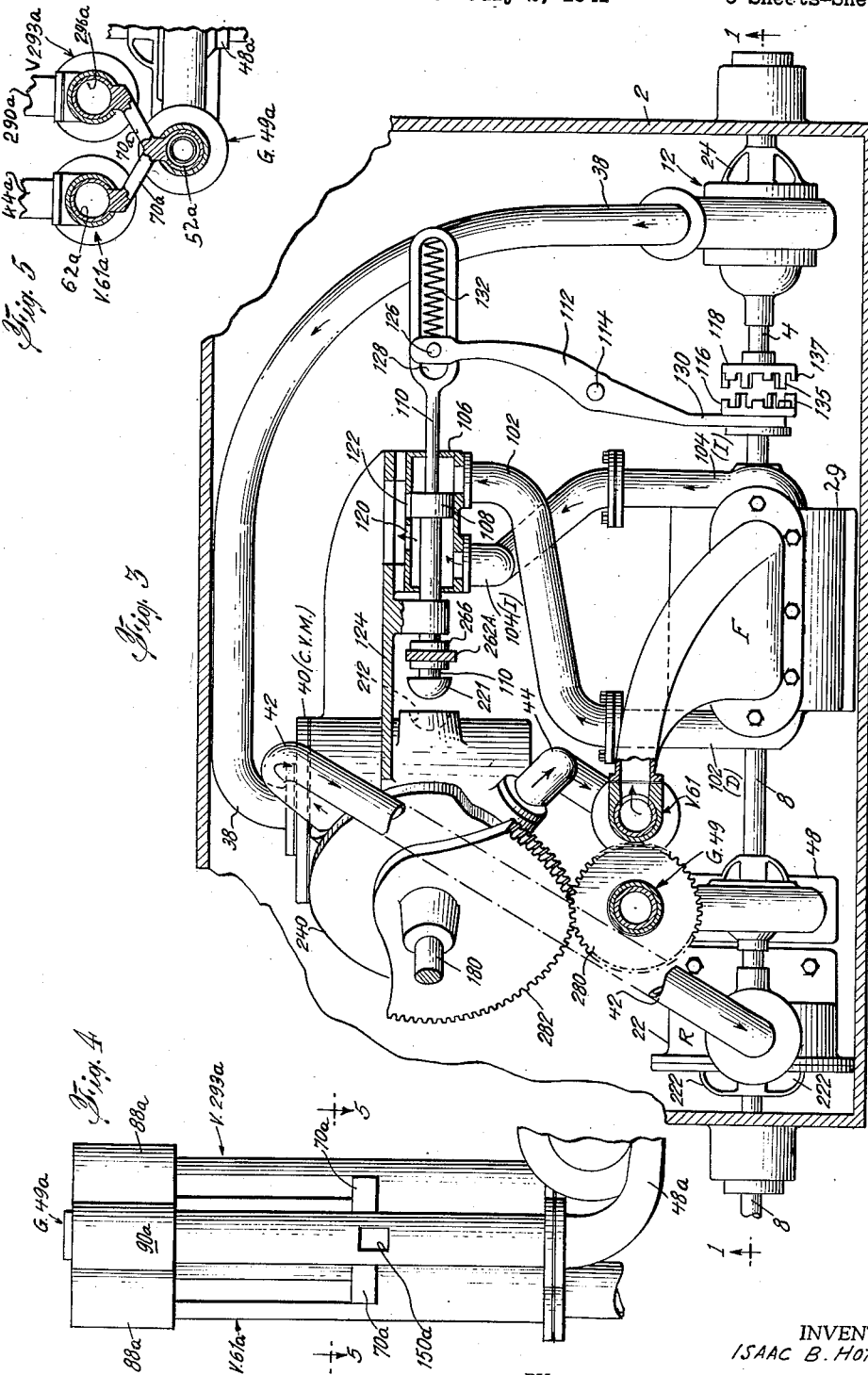

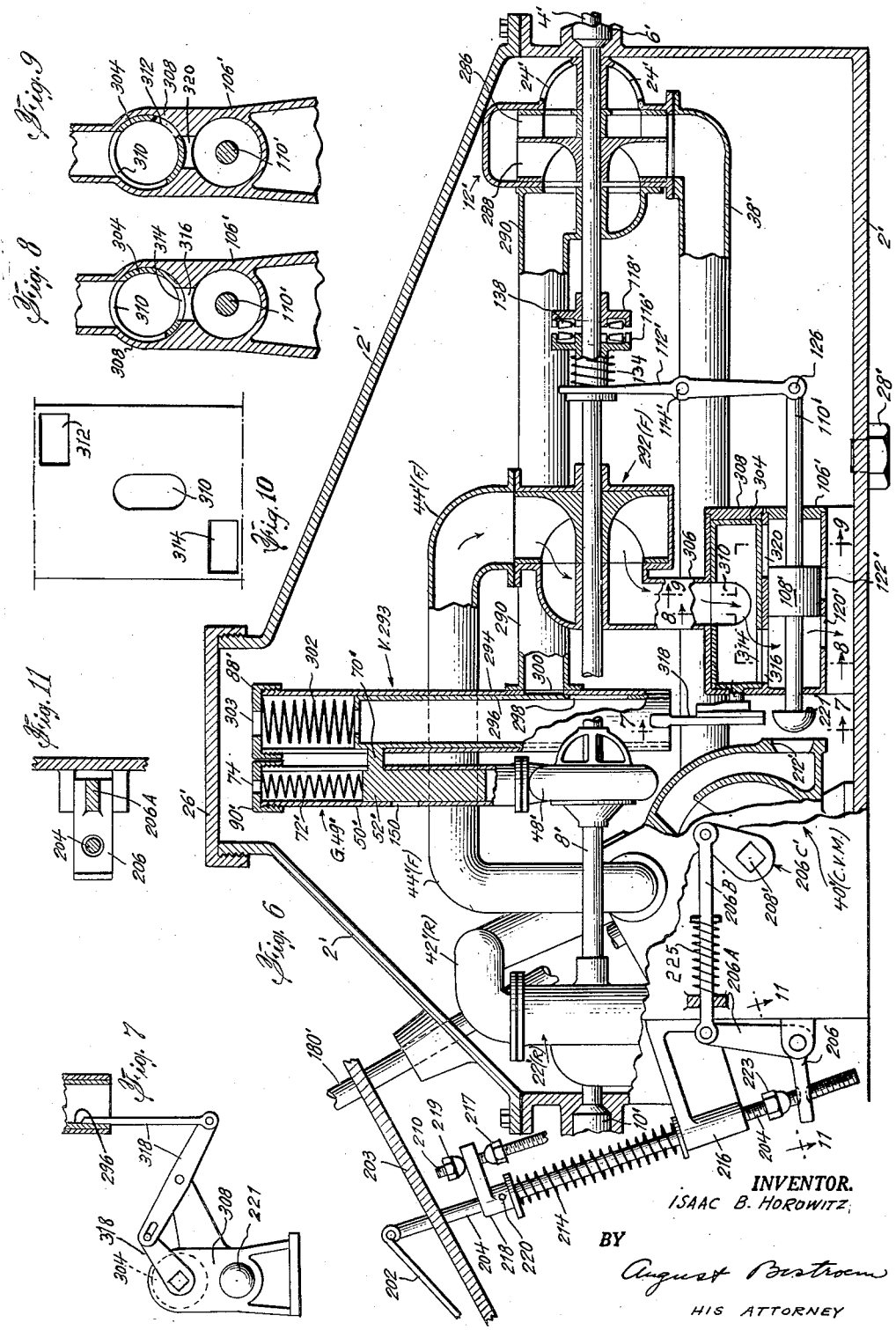

Sept. 26, 1944.  I. B. HOROWITZ  2,359,267
POWER TRANSMISSION
Filed July 2, 1941  9 Sheets-Sheet 4
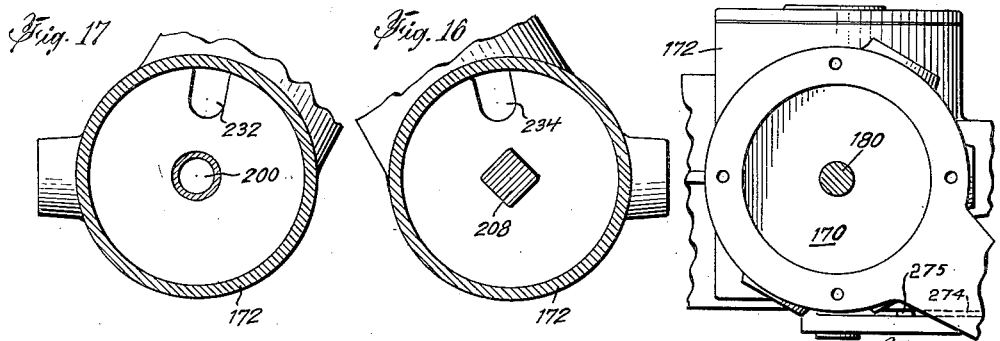
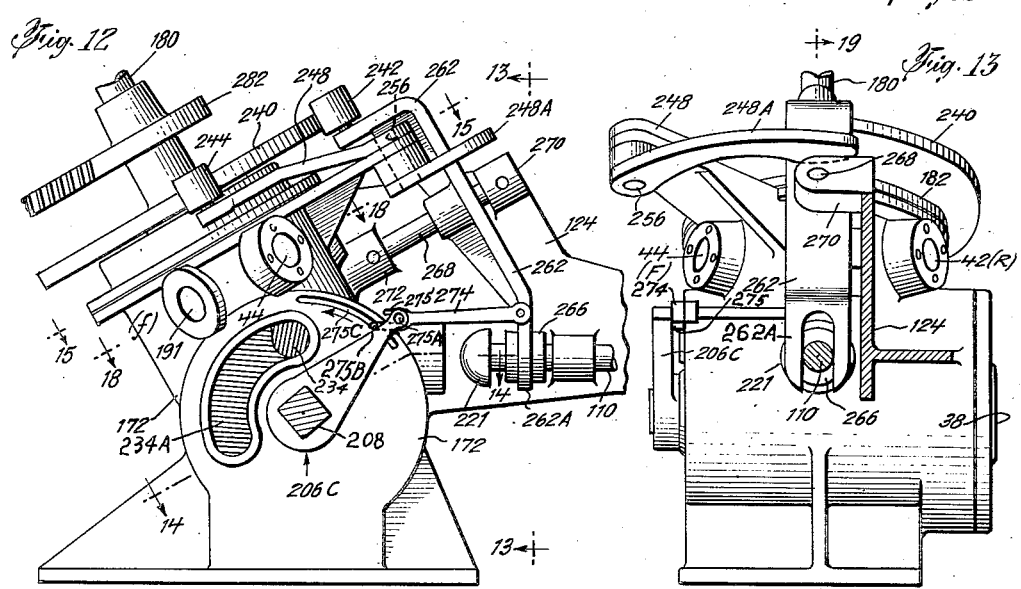
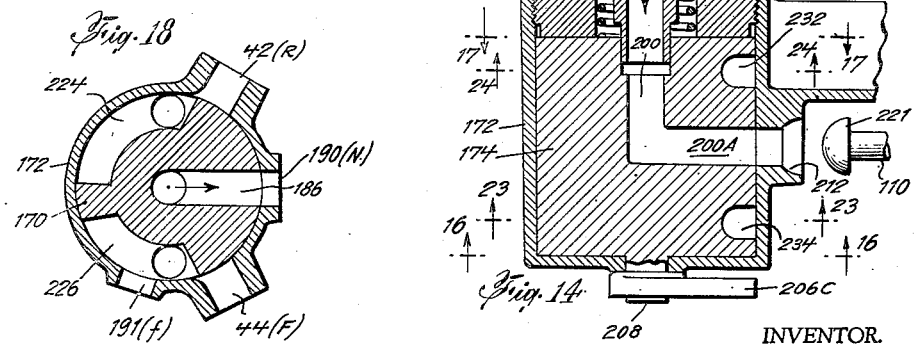
INVENTOR.
ISAAC B. HOROWITZ
BY August Bostroem
HIS ATTORNEY

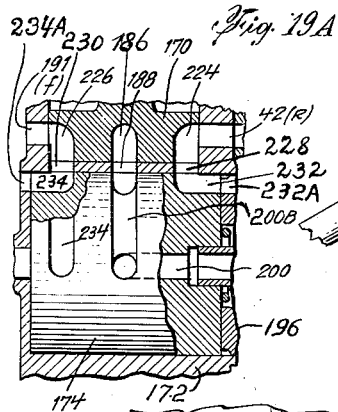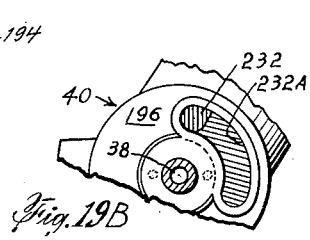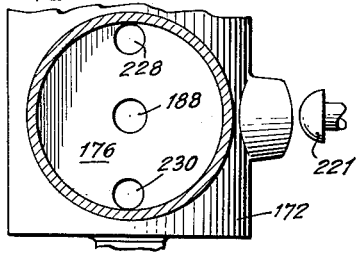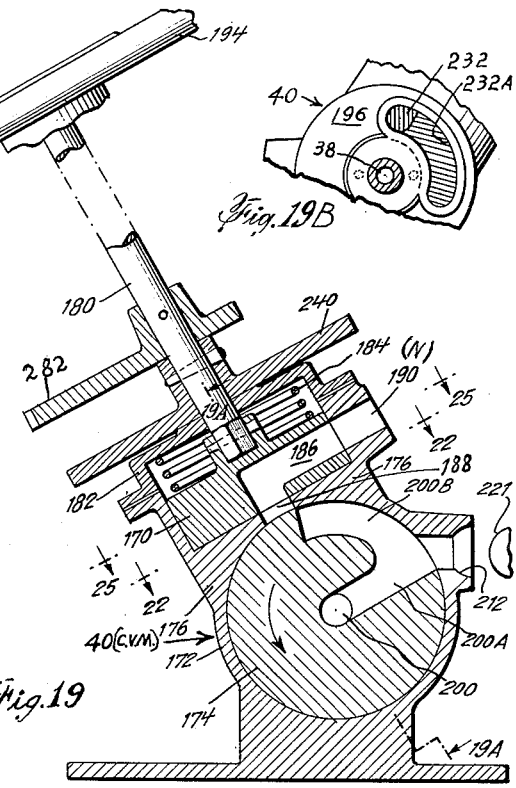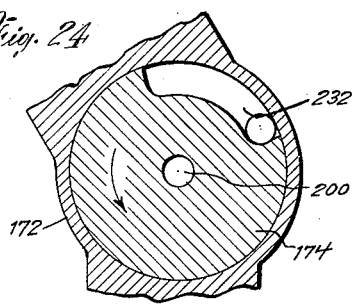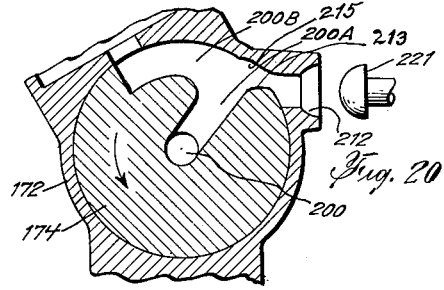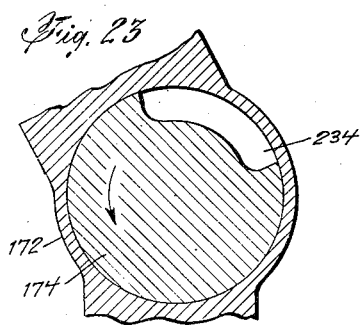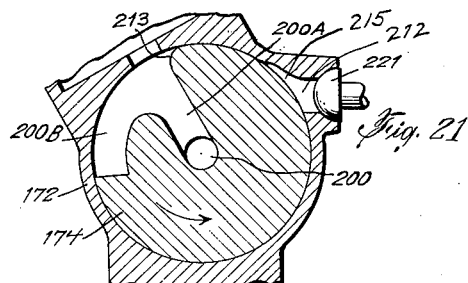

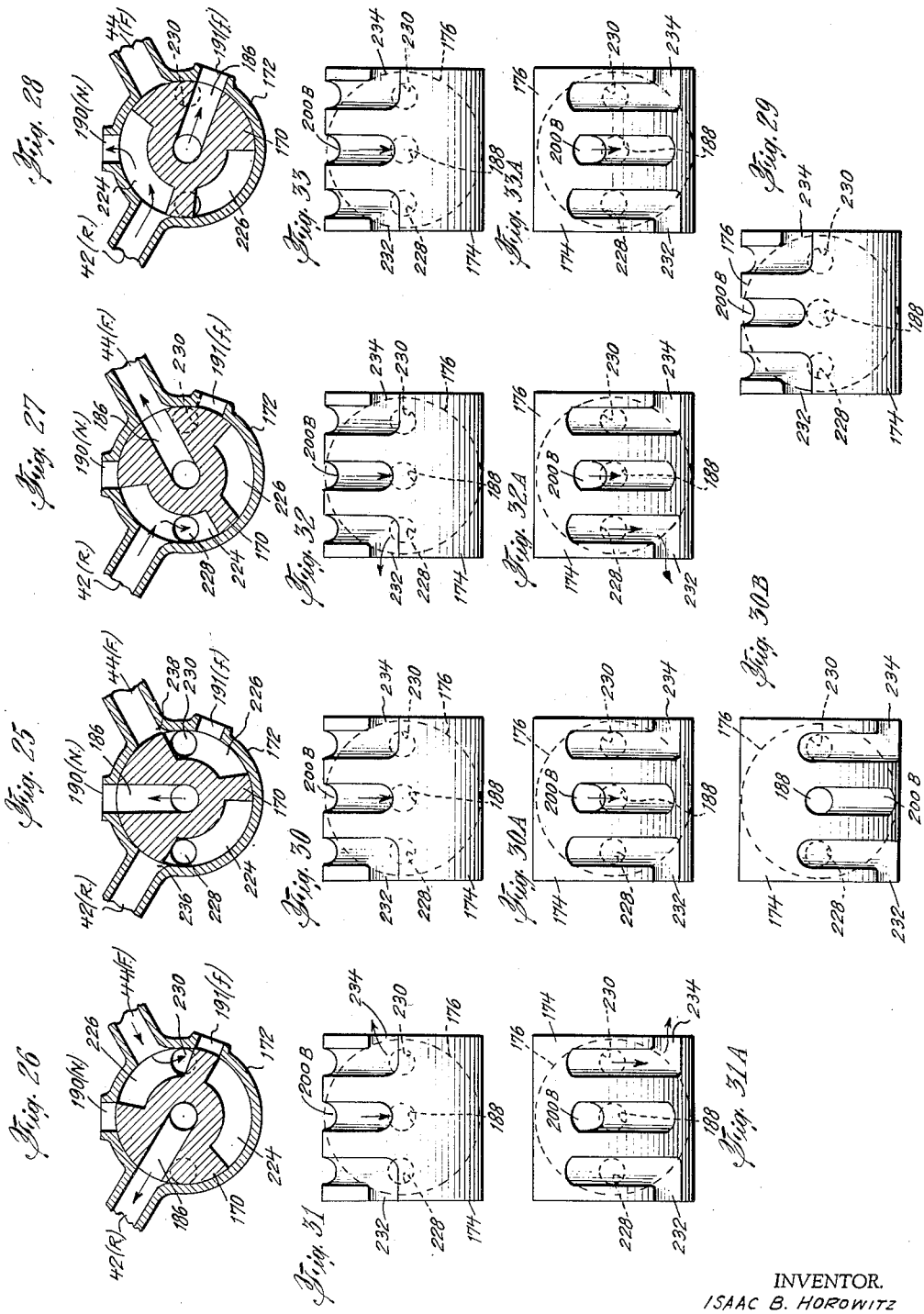

Sept. 26, 1944.     I. B. HOROWITZ     2,359,267
POWER TRANSMISSION
Filed July 2, 1941     9 Sheets-Sheet 7
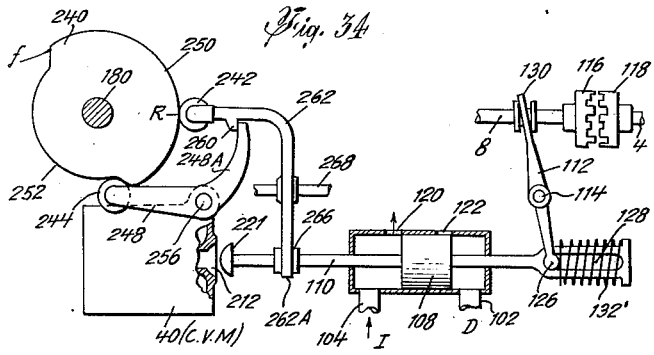
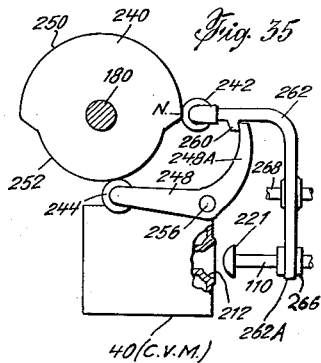
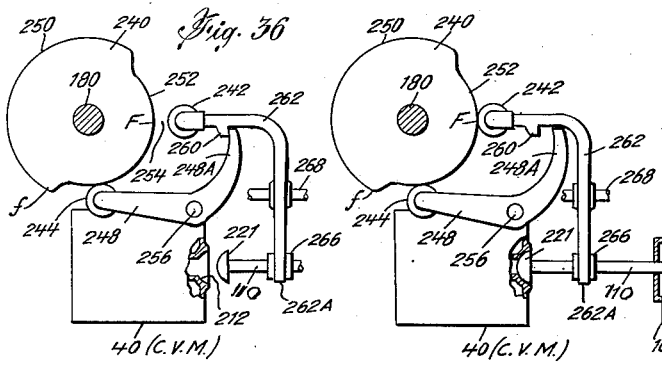
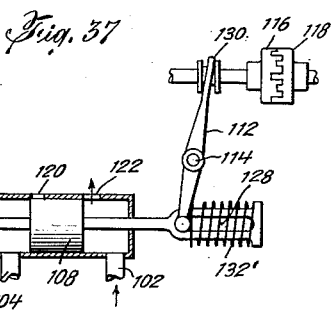
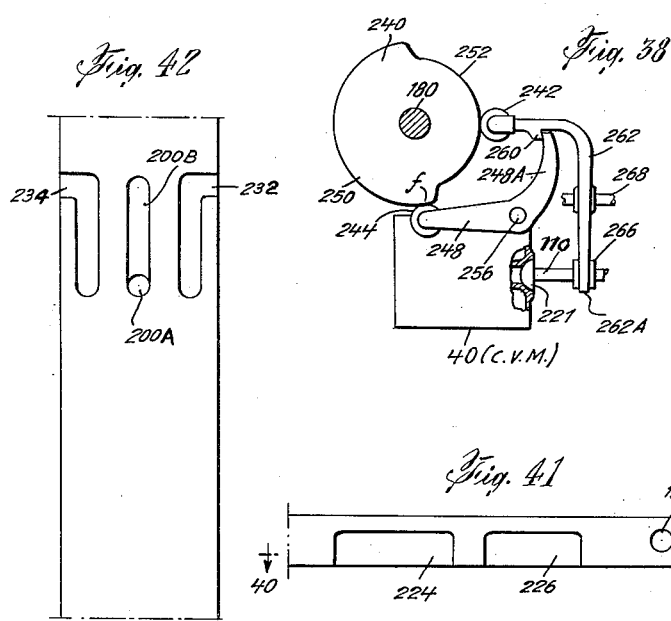
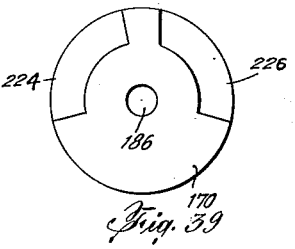
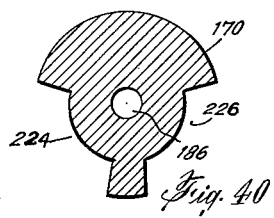
INVENTOR.
ISAAC B. HOROWITZ
BY August Bistroem
HIS ATTORNEY

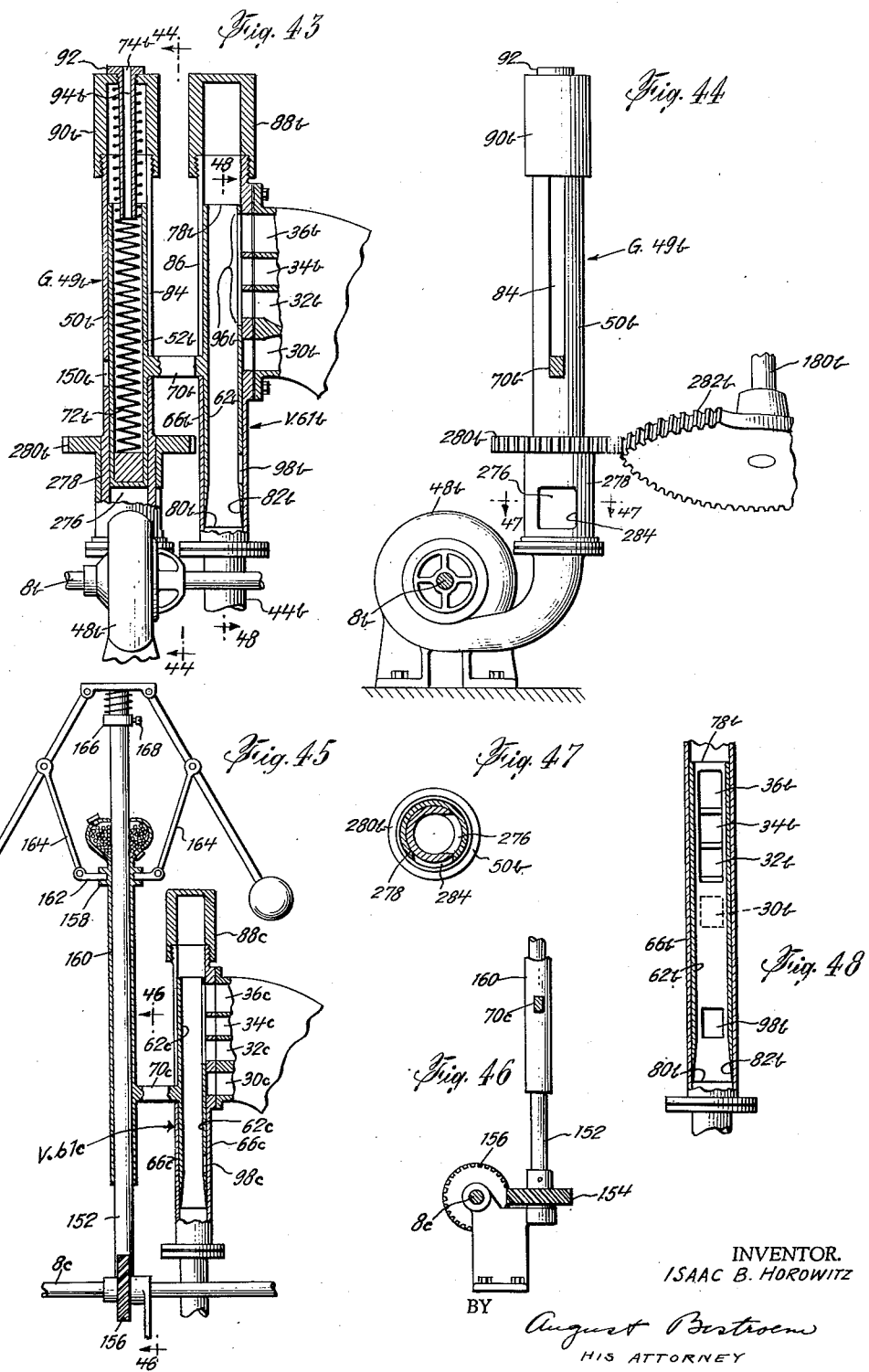

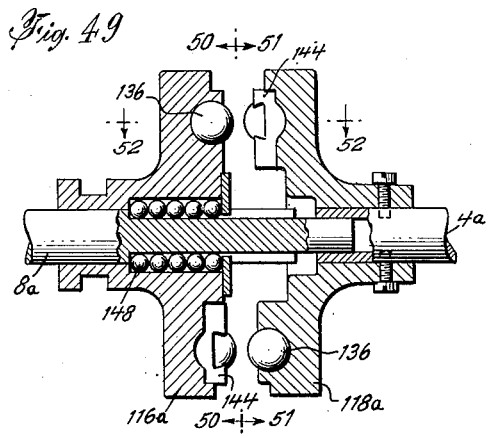
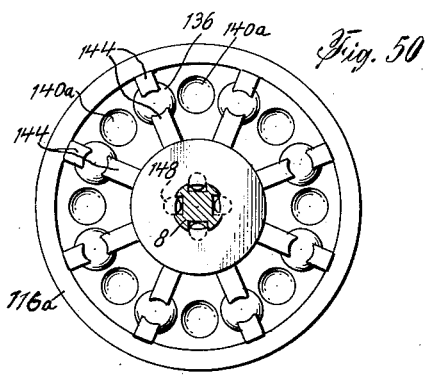
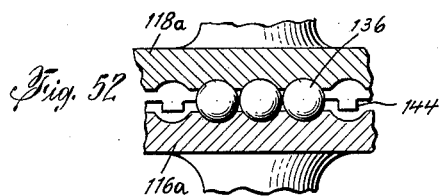
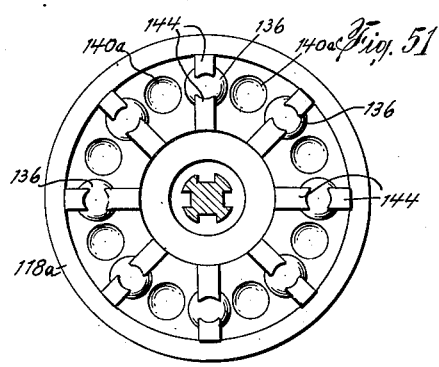
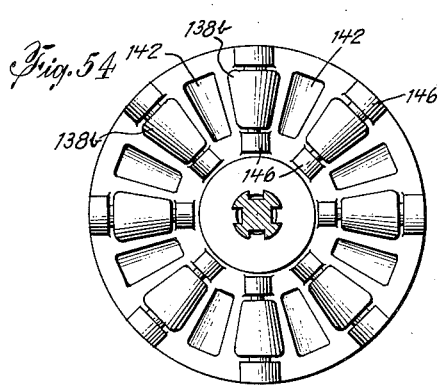
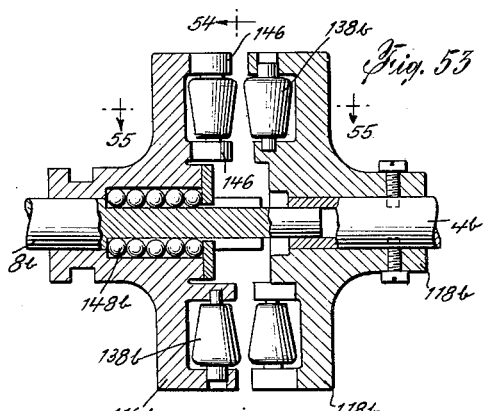
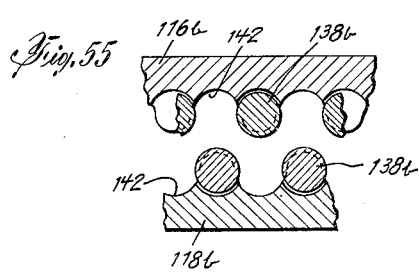
INVENTOR.
ISAAC B. HOROWITZ Patented Sept. 26, 1944

2,359,267

UNITED STATES PATENT OFFICE 2,359,267

POWER TRANSMISSION

Isaac B. Horowitz, New York, N. Y.

Application July 2, 1941, Serial No. 400,717

21 Claims. (Cl. 192—3.2)

This invention relates generally to power transmissions and more particularly to power transmissions comprising speed changing mechanism of the continuously variable speed ratio type.

While my invention has been disclosed herein as applied to a motor vehicle, it is to be understood that its application is not necessarily so restricted, and that, particularly as to certain phases thereof, it may have far wider application.

The general object of my invention is the provision of a power transmission of the character described that is simple, effective, and low in cost of manufacture, operation and maintenance.

A further object of my invention is the provision of a device of this nature that is fully automatic and wherein the conventional friction clutch and gears, or band clutches, that are used in the indirect drive of the mechanical and mechano-fluid transmissions with which I am familiar, are wholly eliminated, so that the vehicle operator is concerned exclusively with the fuel control mechanism once the transmission is set for the forward or reverse drive.

A further object of my invention is the provision in a transmission in which an operating fluid is used, of a construction whereby the action of said operating fluid upon the driven shaft may be used for car-braking purposes.

Another object of my invention is the provision in a power transmission of a construction offering all the advantages of fluid transmissions, both at low and at high speeds, while at the same time retaining the mechanical direct drive, and in which this mechanical direct drive, while built to function in a fully automatic manner, may also be brought, through manual means, under the control of the operator, should conditions demand it, as, for instance, when the car stalls and it becomes necessary to return the transmission to the neutral condition for starting the engine, or when the starting apparatus is out of order and it becomes necessary to start the engine through putting the car in direct drive and pushing it.

Among other objects of my invention are: the provision in a power transmission of the character described, of a construction whereby exceedingly low speeds suitable for heavy traffic may be attained without danger of stalling the engine, the provision of improved means for effecting the engagement of the driving and driven members whereby the direct drive is effected with great ease and smoothness, and the provision of means for effecting the automatic return of the transmission to the state wherein the engine is simply idling when the foot pressure upon the gas accelerator is discontinued.

These objects and such other objects as will hereinafter appear or be pointed out are attained in the illustrative embodiments shown in the drawings in which:

Fig. 1 is a longitudinal section of one form of the invention taken substantially on line 1—1 of Fig. 3, looking in the direction of the arrows;

Fig. 2 is a plan view of part of the steering wheel, of the operating handlever and of the dial associated therewith;

Fig. 3 is a top view of the invention, partly in cross section, taken substantially on line 3—3 of Fig. 1, looking in the direction of the arrows;

Fig. 4 is an elevational view of the speed gage and of the valves regulating the flow of the operating fluid to the fluid-propelled means and to the fluid-propelling means of the transmission in another form of the invention;

Fig. 5 is a horizontal cross section of Fig. 4 taken substantially on line 5—5 looking in the direction of the arrows;

Fig. 6 is a longitudinal view, partly in section, of still another form of the invention, including the means for operating the vehicle, which is common to all the forms of the invention;

Fig. 7 is a detail view of part of the mechanism concerned in the establishment of the automatically functioning direct drive taken on line 7—7 of Fig. 6 looking in the direction of the arrows;

Fig. 8 is a cross section of another part of the mechanism concerned in the establishment of the automatically functioning direct drive taken substantially on line 8—8 of Fig. 6, looking in the direction of the arrows;

Fig. 9 is a view similar to Fig. 8 but taken on line 9—9 of Fig. 6, looking in the direction of the arrows;

Fig. 10 is a developed view of the cylinder constituting part of the automatically functioning direct drive mechanism disclosed in Figs. 6, 8 and 9;

Fig. 11 is a cross section of the connection between the foot-pedal-shaft and the system of levers linking this member to the operating valve, taken on line 11—11 of Fig. 6, looking in the direction of the arrows;

Fig. 12 is a side elevation of the control valve mechanism;

Fig. 13 is a cross section of the control valve mechanism taken substantially on line 13—13 of Fig. 12, looking in the direction of the arrows;

Fig. 14 is a horizontal cross section of the foot-operated valve of the control valve mechanism taken substantially on line 14—14 of Fig. 12, looking in the direction of the arrows;

Fig. 15 is a sectional view of the manually operated valve of the control valve mechanism taken substantially on line 15—15 of Fig. 12, looking in the direction of the arrows;

Fig. 16 is a sectional view showing one end of the foot-operated valve of the control valve mechanism and the surrounding parts taken substantially on line 16—16 of Fig. 14, looking in the direction of the arrows;

Fig. 17 is a sectional view showing the other end of the foot-operated valve of the control valve mechanism taken substantially on line 17—17 of Fig. 14, looking in the direction of the arrows;

Fig. 18 is a horizontal cross section of the manually operated valve of the control valve mechanism taken substantially on line 18—18 of Fig. 12, looking in the direction of the arrows;

Fig. 19 is a vertical section through the whole control valve mechanism taken substantially on line 19—19 of Fig. 13, looking in the direction of the arrows, and showing both valves at rest, viz., in non-actuated or neutral position;

Fig. 19A is a cross section of the same control valve mechanism taken substantially on line 19A—19A of Fig. 19, looking in the direction of the arrows;

Fig. 19B is a fragmentary detail view of a portion of the control valve casing;

Fig. 20 is a vertical section through the foot-operated valve of the control valve mechanism as shown also in Fig. 19 but turned counter-clockwise, that is, in actuated position;

Fig. 21 is a vertical section through the foot-operated valve of the control valve mechanism as shown also in Figs. 19 and 20, but turned still farther counter-clockwise;

Fig. 22 is a sectional view showing the diaphragm separating the manually operated valve from the foot-operated valve of the control valve mechanism, taken substantially on line 22—22 of Fig. 19, looking in the direction of the arrows;

Fig. 23 is a section through the foot-operated valve taken substantially on line 23—23 of Fig. 14, looking in the direction of the arrows;

Fig. 24 is a section through the same valve taken substantially on line 24—24 of Fig. 14, looking in the direction of the arrows;

Fig. 25 is a section through the manually operated valve of the control valve mechanism taken substantially on line 25—25 of Fig. 19, looking in the direction of the arrows, and showing the plug set in neutral position;

Fig. 26 is a view similar to Fig. 25 but with the plug set for the reverse drive;

Fig. 27 is a view similar to Fig. 25 but with the plug set for the forward, automatically functioning, drive;

Fig. 28 is a view similar to Fig. 25, but with the plug set for the manually effected direct drive;

Fig. 29 is a top view of the foot-operated valve-plug of the control valve mechanism, when at rest, viz., in neutral position, in its relation to the diaphragm (shown in dotted lines), separating it from the drive setting valve of the same mechanism, which is in the position of Fig. 25;

Fig. 30 is a view similar to Fig. 29 but showing the valve-plug farther actuated;

Fig. 30A is a view similar to Fig. 30 but showing the valve-plug still farther actuated;

Fig. 30B is a view similar to Fig. 30 but showing the valve-plug fully actuated;

Fig. 31 is a view similar to Fig. 29 but with the valve-plug only slightly actuated and with the drive-setting valve-plug as shown in Fig. 26 above it; note the right side arrows in the drive-setting valve;

Fig. 31A is a view similar to Fig. 31 but with the valve-plug farther actuated;

Fig. 32 is a view similar to Fig. 29 but with the valve-plug only slightly actuated, and with the drive-setting valve-plug in the position of Fig. 27 above it, that is in the forward, automatically functioning drive; note the left side arrows in the drive-setting valve.

Fig. 32A is a view similar to Fig. 32 but showing the valve-plug farther actuated;

Fig. 33 is a view similar to Fig. 29 but showing the valve-plug only slightly actuated and the drive-setting valve-plug shown as in Fig. 28 above it, that is, in the manually effected direct drive position;

Fig. 33A is a view similar to Fig. 33 but showing the valve-plug farther actuated;

Fig. 34 is a diagrammatic view of the cam, carried by the operating shaft, in its relation to the direct-drive-effecting means during the reverse drive;

Fig. 35 is a diagrammatic view similar to Fig. 34 but showing the parts in the neutral position of the transmission;

Fig. 36 is a diagrammatic view similar to Fig. 34 but showing the parts in the foward, indirect drive position;

Fig. 37 is a diagrammatic view similar to Fig. 34 but showing the parts in the automatically functioning direct drive position;

Fig. 38 is a diagrammatic view similar to Fig. 34 but showing the parts in the manually effected drive position;

Fig. 39 is a bottom plan view of the manually operated, drive-setting, valve-plug;

Fig. 40 is a transverse cross section through the lower part of the same valve-plug at the level of the line 40—40 of Fig. 41, looking in the direction of the arrows;

Fig. 41 is a developed view of the outer surface of the same valve-plug of the control valve mechanism;

Fig. 42 is a developed view of the outer surface of the foot-controlled valve-plug of the control valve mechanism;

Fig. 43 is a modified form of the gage responsive to the speed of the driven shaft and of the tubular valve associated therewith shown in Fig. 1;

Fig. 44 is a sectional side view through the gage of Fig. 43, taken substantially on line 44—44 of Fig. 43, looking in the direction of the arrows;

Fig. 45 is a sectional view of a centrifugal governor and tubular valve adapted for use with my transmission in place of the speed responsive gage;

Fig. 46 is a fragmentary sectional view taken substantially on line 46—46 of Fig. 45, looking in the direction of the arrows;

Fig. 47 is a horizontal cross section of the speed-responsive gage of Fig. 43 taken substantially on line 47—47 of Fig. 44, looking in the direction of the arrows;

Fig. 48 is a vertical section of the tubular valve of Fig. 43 taken substantially on line 48—48 of Fig. 43, looking in the direction of the arrows;

Fig. 49 is a sectional view of an improved positive clutch suitable for the direct drive, the view being taken in a plane passing through the axes of the driving and driven shafts.

Fig. 50 is a cross sectional view taken substantially on line 50—50 of Fig. 49, looking in the direction of the arrows;

Fig. 51 is a cross sectional view taken substantially on line 51—51 of Fig. 49, looking in the direction of the arrows;

Fig. 52 is a sectional view taken substantially on line 52—52 of Fig. 49, looking in the direction of the arrows, but showing the clutch members in engagement;

Fig. 53 is a sectional view of another form of the positive clutch suitable for the direct drive as viewed in a plane passing through the axes of the driving and driven shafts;

Fig. 54 is a cross sectional view taken substantially on line 54—54 of Fig. 53, looking in the direction of the arrows;

Fig. 55 is a cross sectional view taken substantially on line 55—55 of Fig. 53, looking in the direction of the arrows.

Before proceeding with a detailed description of the drawings, reference will be had to the following symbols which will better serve to explain the structure and which occur in the drawings in which: N stands for neutral, R for reverse drive, F for the automatically functioning forward drive, including a direct drive, f for the forward, manually effected, non-automatic, auxiliary direct drive, D for direct drive, I for indirect drive, V for valve, G for gage, and C. V. M. for control valve mechanism.

It is also to be observed that parts of the embodiment of Fig. 6 which are similar to parts of the embodiment of Fig. 1 have been similarly numbered but the numbers have been primed to distinguish them. Where parts similar to those of either of these embodiments are similar to parts of the other embodiments or modifications disclosed herein, these parts have been similarly numbered, but a suffix has been added to the numeral to distinguish them. For example the numerals in the modified form of speed responsive arrangement of Figs. 4 and 5 have had the suffix a added, while the numerals in the modification of Figs. 43, 44, 47 and 48 have had the suffix b added. Similarly the numerals occurring in the modified form of clutch arrangement of Figs. 49, 50, 51 and 52 have had the suffix a added, and the numerals occurring in the modified form of clutch arrangement of Figs. 53, 54 and 55 have had the suffix b added.

The numerals used for the modified form of speed responsive arrangement of Figs. 45 and 46 have had the suffix c added.

Broadly stated, my improved transmission comprises a fluid-propelling means and a fluid-propelled means, either one or both of which are divided into sections, a control valve mechanism for directing the operating fluid to the proper channel, a gage responsive to the speed of the driven shaft and a valve arrangement functioning in association with said gage and regulating, automatically and continuously, the flow of the operating fluid to said fluid-propelled means, or to said fluid-propelling means or to both, in a predetermined ratio to the prevailing speed and load of the vehicle, thus creating a variable effective volume in either the propelled means or the propelling means or in both, this resulting in a variable power transmission.

While in an ordinary gear transmission both driving and driven gears may have to vary in size for each speed because of the parallelism of the shaft and countershaft, no such structural exigency exists in a transmission of the kind under consideration; hence satisfactory operating results will be obtained if either the fluid-propelling part alone, or the fluid-propelled part alone, is constructed for a variable effective volume. It should further be borne in mind that in a transmission of the kind I am about to describe the volumetric capacity of the fluid-propelling means corresponds to the diameter of the driving gear of a so-called standard transmission, and the volumetric capacity of the fluid-propelled means corresponds to the diameter of the driven gear of this last named type of transmission.

I shall first describe the transmission in the form wherein the fluid-propelled means actuating the driven shaft is constructed to be susceptible to a variation of its effective volumetric capacity, then the transmission in the form wherein the fluid-propelling means actuated by the crankshaft is constructed to be susceptible to a variation of its effective volumetric capacity; the combination of the two forms wherein both the fluid-propelled means and the fluid-propelling means are constructed to be susceptible to a variation of their effective volumetric capacities will then be easily understood. It should be added that each form has its own advantages.

Referring now more particularly to the drawings, Fig. 1 discloses the general relationship of some of the operative parts of my improved transmission in its first form, these parts being positioned in housing 2, which presents openings for the passage of driving shaft 4, journalled in bearing 6 and of driven shaft 8 journalled in bearing 10. The transmission proper consists of a centrifugal pump 12 mounted in housing 2 and constituting the propelling part of the mechanism, and a multiplicity, or system, of turbines 14, 16, 18, 20 and 22 likewise mounted in housing 2 and constituting the propelled part of this mechanism. It is understood that turbines 14, 16, 18 and 20 designated as a group by the letter F (forward) are concerned in the forward drive while turbine 22, designated also by the letter R (reverse), is concerned in the reverse drive. Impeller 13 of the centrifugal pump is mounted on the driving shaft which is shown as an extension of the crankshaft of the engine while vanes 31 of the forward drive turbines and vane 33 of the reverse drive turbine are mounted on the driven shaft.

While the means used in the device for propelling the operating fluid is shown as a contrifugal pump, it will be obvious that any other type of fluid propelling means might be used without departing from the fundamentals of my invention.

To obviate the necessity for priming the centrifugal pump the level of the operating fluid in the transmission housing should be kept above the level of the "eye" or suction entrance 24 around the driving shaft. The operating fluid may also, if desired, be sucked in from a lower level of the housing as through a duct 25. The transmission housing may be charged with operating fluid through an opening covered by removable cap 26, and drained, when necessary, through an opening closed by plug 28.

Since turbines 14, 16, 18, and 20 may be enclosed, if desired, in one casing 29, they may be called more appropriately "turbine-sections" or "turbine-compartments," reserving the term "turbine" for the entire group F of the forward drive and for the propelled means 22 of the reverse drive. It is understood that vanes 31 of the F group of turbine-compartments concerned in the forward drive are so arranged and shaped, and the operating fluid is directed against them at such an angle, that when they are actuated they will cause the driven shaft 8 to turn in the same direction as the revolving crankshaft 4, while vane 33 of turbine 22 concerned in the reverse drive is so shaped and arranged, and the operating fluid is directed at such an angle against it, that when it is actuated it will cause the driven shaft to turn in the opposite direction to that of the revolving crankshaft.

The operating fluid leaving centrifugal pump 12 is carried by duct 38 to control valve mechanism 40 (C. V. M.), Fig. 3; from this mechanism it may be directed through duct 42 to reverse drive turbine 22, or to the forward drive turbine F through duct 44 and tubular valve V61 which regulates the course of this fluid selectively to the various turbine-compartments 16, 18, and 20 concerned in the continuously variable indirect forward drive, or to turbine-compartment 14 concerned in the indirect high drive and in the effecting of the mechanical direct drive.

Since the vanes of the various turbine-compartments are all rigidly mounted on the driven shaft it follows that if propelling fluid is delivered against one vane all the other vanes will revolve with said driven shaft, but not effectively, that is, they will not contribute to the transmission of power to the driven shaft; the vane of the compartment into which fluid has been delivered is the only effective one, all the others merely idling.

Control valve mechanism 40 just mentioned, together with its appendages, is the means for putting the vehicle in speed for the forward drive and the reverse drive, for accelerating the motor both during idling and during the actuation of the driven shaft and also for braking the vehicle through the action of the operating fluid upon the driven shaft. The control valve mechanism and its appendages will be fully described hereinafter.

Regarding the volume of turbine 22 of the reverse drive, and of turbine F of the forward drive, regarding the diameter of the rotors of these two turbines and regarding the number of compartments into which the turbine F should be divided for best results, it is obvious that:

1. Since the volume of the fluid-propelled means in a transmission of the kind under consideration corresponds to the size of the diameter of the driven gear in a standard transmission, the greater this volume the lower the speed at which it is possible to operate the vehicle in the indirect drives, forward and reverse, because a rapid revolving of the propelling means, that is, of the engine, will result only in a slow revolving of the fluid-propelled means, that is, of the driven shaft, the same as in an ordinary transmission where the rapid revolving of a driving gear of small diameter results in a comparatively slow revolving of a corresponding driven gear if this driven gear be of large diameter.

2. The greater the diameter of the rotors of the turbines the easier it will be to start the vehicle because of the more favorable leverage.

3. Apparently, since the variation in the effective volume of the fluid-propelled means depends upon a multiplicity of turbine-compartments that may be rendered effective selectively in the indirect forward drive, the greater the number of these turbine-compartments the better the results as to smoothness of acceleration and deceleration; actually, however, because the operating medium is a fluid and such a medium may be diverted gradually from one turbine-compartment to another, the number of these compartments need not exceed two or three for said indirect forward drive, as shown in Fig. 1, where compartments 16, 18 and 20 are reserved for the indirect forward drive and compartment 14 for the direct drive. The manner in which turbine-compartment 14 brings about the direct drive will be fully explained hereinafter.

It should be noted that in the reverse drive we are not much concerned with a variable speed transmission; hence in this drive one turbine of adequate capacity is sufficient and the operating fluid may be directed straight, though gradually, from the control valve mechanism 40 into this turbine. In the forward drive, however, a variable speed transmission being indispensable, not only will at least two turbine-compartments be necessary but some means for regulating the flow of the operating fluid into these compartments to implement this variable speed transmission will also be necessary, this means functioning of necessity in relation to the speed of the driven shaft.

It is known that in a vehicle depending upon internal explosions for its power the speed of the driven shaft must be lower than that of the driving shaft as long as this power is not sufficiently developed; when, however, said power has gone up sufficiently the transmission gear ratio may be changed so that a higher speed of the driven shaft may result without racing of the engine. Accordingly, in my invention, in the indirect forward drive the driven shaft will turn over at a low speed if the turbines mounted on it will be actuated by the operating fluid in such a manner that they will turn over at a low speed even though the engine is running at a high speed, and the same shaft will turn over at a higher speed if the operating fluid, through more engine power, causes said turbines to turn over at a higher speed even though the engine is now running at the same speed as before, or even at a lower speed. To obtain the desired results in an automatic manner, I make use of a suitable arrangement, of the fluid, mechanical or mechano-fluid type, responsive to the actual, or relative, speed of the car through any of its parts, such as the driven shaft, in association with a device regulating the flow of the operating fluid into the turbine-compartments in such a manner as to set the speed of their vanes, gradually and continuously, in a predetermined ratio to the speed and load of the car for optimum performance of the mechanism.

The aforesaid speed-responsive arrangement may take the form of a fluid pressure gage, or of a speed indicator of any suitable type such as a centrifugal governor, while the device regulating the flow of the operating fluid to the various turbine-compartments may be a valve or set of valves, the actuating, or influencing position of which is determined by the aforementioned speed-responsive contrivance with which it is associated. In actual practise I have found that a fluid pressure gage satisfactorily meets the requirement for a speed responsive device because this type of gage is simple, sturdy, easy to manage for the various demands made upon it and because it has little tendency to lag in its operation; I will, however, take up the adaptation of a governor to my invention merely as a possible substitute for the above mentioned gage.

The fluid pressure gage G48, in an illustrative form selected by way of example from one of its many possible forms, consists of a small and simple centrifugal pump 48, actuated by the driven shaft 8, upon which it is mounted, a tube 50, closed at its upper end by a cap 90, and a spring-controlled plunger 52 movable inside this tube. We know that a centrifugal pump at a given speed will develop a definite head; consequently, this head may be taken as a measure of the speed of its shaft which, in our case, is the driven shaft of the transmission since the pump is mounted on, or at least actuated by, this shaft as already stated. The head or pressure developed by the centrifugal pump is used to displace spring-controlled plunger 52 inside tube 50 so that this plunger will assume a position variable with the speed of the driven shaft. A port 54, is provided in tube 50 near its upper end, as shown in Fig. 1, or a port at the very end of the gage, as shown at 74 in the gage G49' of Fig. 6, or at 74b in the gage G49b of Fig. 43, so that any operating fluid that may seep in between plunger and tube may be expelled into the transmission housing, as otherwise it would interfere with the proper functioning of the gage. Spring 72 set between the lower end 60 of the plunger 52 and cap 90 at the upper end of tube 50 is intended to resist the too easy displacing of the plunger 52 and will return this member to its position of rest when the head in the pump drops. Where a vertical position of the plunger is possible, advantage may be taken of a counterpoise 56, connected with the plunger 52 and the tube 62 in any suitable or preferred manner, as by members 58 and 68, to help the spring perform its function. If a horizontal position of the gage is unavoidable entire reliance for reaction to the head of the centrifugal pump must be placed on the spring, as shown in Fig. 6 at 72' and in Fig. 43 at 72b.

Plunger 52 is connected with, and carries along in its movements, tube 62 of valve V61. This valve is composed of a duct 66 closed at its upper end 76 by a cap 88 and tube 62, just mentioned, inside of this duct. The connection between tube 62 and plunger 52 of the gage may be either through counterpoise 56 and arms 58 and 68 as shown in Fig. 1, or through a cross-link 70, as shown in Fig. 6, or a cross-link 70b, as shown in Fig. 43. Tube 62 is open at both its ends 78 and 80; its inner surface should be perfectly smooth as any rough parts or flanges projecting inwards would cause the operating fluid reaching it from control valve mechanism 40, Fig. 3, through duct 44 to which it is attached, to influence its position and this would be extremely harmful, as the position of this tube, which as has already been stated, regulates the flow of the operating fluid to the turbine-compartments of the automatically functioning forward drive, must be regulated by the movements of plunger 52 of the gage exclusively. As a further precaution in this respect the inner surface of the lower part 82 of this tube 62 should be bevelled downwards and outwards.

Referring again to Fig. 43 which discloses a variation of the connection between plunger 52b and tube 62b, it will be seen that tube 50b presents a fissure 84 running to its upper end and that duct 66b presents a fissure 86 running to its upper end; these fissures are intended to accommodate cross-link 70b as it glides up and down with the two members it connects. Caps 88b and 90b shown in this figure are considerably longer than the corresponding caps 88 and 90 in Fig. 1 because they have to accommodate the upper end of plunger 52b and tube 62b in their movement upward. Channeled member 92 carried by cap 90b acts as a support for spring 72b through contact with its inner surface and prevents it from wabbling, though the inner diameter of the cap may, for this purpose, be reduced to the size of the outer diameter of this spring, thus dispensing with member 92. Any operating fluid that may accumulate between tube 50b and plunger 52b and thus interfere with the proper functioning of the gage G49b is forced out through channel 94b of member 92 ending in port 74b.

Returning now to the embodiment of Fig. 1, before going into the details of the functioning of tube 62 of tubular valve V61 it should be recalled that turbine-sections 16, 18, and 20 are reserved for the indirect forward drive wherein the speed of the driven shaft 8 is lower than the speed of the driving shaft 4 (crankshaft) while turbine-section 14 is reserved for the fluid high drive, that is, the drive wherein the speed of the driving shaft and driven shaft tend to become equal. In this fluid high drive not only do the two shafts revolve at substantially equal speeds but they become automatically engaged for a direct drive if conditions in the transmission permit this to take place without clashing; if conditions are momentarily not favorable for the effecting of the direct drive without clashing then the fluid high drive continues to operate so that the transmission of power remains unaffected in any way.

Coming now to valve-tube 62 it will be seen that it presents near its upper end an elongated port 96 indicated by a bracket, and a second port, 98, near its lower end. Elongated port 96 is shown to extend over the openings of ducts 32, 34 and 36 leading respectively to turbine-sections 16, 18 and 20 of the indirect forward drive, wherein the speed of the driven shaft is lower than that of the driving shaft; that part of the tube wall which extends between ports 96 and 98 and which is indicated by a second bracket 100, is shown to cover and seal the opening of duct 30 leading to turbine-section 14 that establishes the automatic direct drive.

When the car is at a standstill, whether the motor is running or not, tube 62, as shown in Fig. 1, is at rest and ready for the lowest indirect forward drive, because in this position it allows the operating fluid coming from the control valve mechanism 40 through duct 44, to flow through ducts 32, 34 and 36 to all the three turbine-sections 16, 18 and 20 of the indirect forward drive, while solid part 100 of the wall of the same tube seals the entrance to duct 30 leading to turbine-section 14 of the automatic direct drive. If, now, the car is put in speed, the head developed under plunger 52 will carry this member upwards, causing tube 62 to move in the same direction. This will cause solid part 100 of the wall of the tube to seal ducts 32, 34 and 36, one by one, until these ducts are all sealed, while port 98 of this same tube comes opposite duct 30 leading to turbine-section 14 of the automatic direct drive and allows the operating fluid to flow into this section.

It is obvious that if a definite amount of operating fluid is forced through all the three turbine compartments 16, 18 and 20 of the indirect forward drive in a given length of time, under a definite load of the car, the driven shaft of the transmission on which these turbine-compartments are mounted, will revolve at a speed likewise definite; if, however, the same amount of operating fluid is made to pass through one turbine-compartment less in the same length of time and under the same load of the car as before, then the driven shaft will be compelled to revolve at a higher speed, and if one more turbine-compartment is cut out under the same conditions a still higher speed of the driven shaft will prevail. Thus it is seen that if a definite amount of operating fluid is forced to pass through less and less turbine volume under otherwise constant conditions, a higher and higher speed will be imparted to the driven shaft, the same as when in changing the ratio of gears in a so-called standard transmission we "throw in" a smaller driven gear. As valve tube 62 keeps on mounting because of the increasing head under plunger 52 due to higher and higher speed of the driven shaft, its port 98, as already stated, will finally come opposite duct 30 leading to turbine-compartment 14 of the automatic direct drive. The relative capacities of compartment 20, the last indirect drive compartment to be shut off, and compartment 14 of the direct drive now to be established, are such that during the effectiveness of compartment 20 the speed of the driven shaft 8 is lower than that of the crankshaft 4 while during the effectiveness of compartment 14 the speed of the driven shaft tends to become equal to that of said crankshaft. Hence, during the effectiveness of turbine-compartment 14 a direct drive becomes desirable and possible. This direct drive is brought about in the following manner: The operating fluid escaping from direct drive turbine-section 14 rushes through duct 102, also marked D (direct), Fig. 1, towards cylinder 106, Fig. 3, and strikes piston 108 on its front side compelling it to move rearwards. A rod 110 which carries this piston is forced to travel in the same direction; this causes forked lever 112 to turn on its pivot 114 and bring positive clutch member 116, mounted on the driven shaft 8, into engagement with positive clutch member 118 mounted on the driving shaft 4 (crankshaft) thus effecting the direct drive. Conversely, as the driven shaft slows down and, with it, centrifugal pump 48 of the speed gage, the head developed under plunger 52, Fig. 1, will fall, so that this member will descend and, with it, tube 62 of valve V61; this will cause part 100 of the wall of tube 62 to again seal the entrance to duct 30 leading to direct drive turbine-section 14 while, gradually, the entrances to ducts 36, 34 and 32 become uncovered so that the operating fluid is once more compelled to pass through turbine-sections 20, 18 and 16 of the indirect drive. As the operating fluid escapes from these sections it rushes through duct 104, also marked I (indirect), and continues its course to cylinder 106, Fig. 3, to strike piston 108 on its rear side compelling it to move forwards, thus carrying rod 110 in the same direction and through forked lever 112 to cause the disengaging of members 116 and 118 of the positive clutch concerned in the direct drive. In Fig. 3 piston 108 is shown in the indirect drive position and sealing port 122, while the operating fluid escapes through port 120; during the direct drive, the piston moving rearwards, seals port 120 so that the operating fluid escapes through port 122.

In order to obtain a perfect alignment between piston-and-cylinder arrangement 108—106 and control valve mechanism 40 it is advisable to connect these devices through some solid member such as plate or bracket 124.

Clashing of clutch members 116 and 118 in the effecting of the direct drive may be obviated by having recourse to a "yielding" connection between rod 110 and lever 112, Fig. 3, such as, for example, by allowing pin 126 of this connection to travel in channel 128 cut out in the rod 110 so that this rod may be pulled rearwards without necessarily forcing the forked end 130 of lever 112 forwards when conditions are not favorable for the engagement of members 116 and 118. Spring 132 lodged inside channel 128 or disposed around the full thickness of the broadened-out end of rod 110 as shown at 132' in Figs. 34 and 37, will take care of the engagement of the two clutch members at the proper moment to be brought about by the revolving of driving and driven shafts. Meanwhile, as already stated, the driven shaft keeps on revolving through fluid means at about the same speed as the driving shaft so that when engagement of the two shafts takes place no jarring will occur. A variation of the above method of holding the engagement of the two clutch members in abeyance until the operation is safely and facilely feasible is disclosed in Fig. 6 wherein the spring 134, corresponding to spring 132, is placed around the elongated collar of member 116', in front of lever 112'.

The benefit derived from this "yielding" connection may further be extended by the use of positive clutch members wherein long teeth 136, alternate with short teeth 137, as shown in Figs. 1 and 3.

Grinding such as usually takes place during the engagement between the two clutch members of the direct drive may be totally obviated by replacing the teeth of these members by elements of a revoluble nature such as balls 136 as shown in Figs. 49–52, or frusto-cones (spindles) as shown at 138 in Fig. 6 and at 138b in Figs. 53–55.

Fig. 49 shows one form of this type of improved positive clutch in longitudinal cross section through the axes of the driving and driven shafts; it will be remarked that in this figure, the jaws 144, that hold the balls, are so shaped that opposing balls may come in contact with one another without interference from them. Figs. 50 and 51 show the two clutch members in the proper position for becoming engaged, balls 136 facing beds 140a in the opposing member, within which they come to rest during the direct drive. This is further clarified in Fig. 52 which is a cross section along line 52—52 of Fig. 49 but showing the clutch members in full engagement.

In the form of clutch shown in Figs. 53 and 54 it will be seen that jaws 146 have a narrower periphery than the corresponding ends of frusto-cones, or spindles, 138b, so that these revoluble elements may come to rest in beds 142 of the opposing member. Fig. 55 is a cross section of these spindles and corresponding beds in the proper position for engagement, the section being taken on line 55—55 of Fig. 53.

Perfect engagement between the two members of the positive clutch will obtain when the centers of the balls, or the axes of the spindles, as the case may be, of both said members, will rest in one single plane, this plane to be perpendicular to the axes of the driving and driven shafts, which axes, of course, are supposed to lie in one straight line. This engagement is maintained by the very pressure of the operating fluid that has brought it about, assisted, to some extent, by the fact that the revoluble elements rest in properly shaped beds in the opposing clutch member.

Should the positive clutch members concerned in the direct drive become accidentally disengaged the tranmission would not thereby return to neutral, since, as already stated, the direct drive is accompanied by a fluid indirect drive of corresponding speed.

Shifting of member 116a may be facilitated by the interposition of revoluble bearing elements 146, between this member and the driven shaft 8a as shown in Figs. 49 and 50 and at 116b and 148b in Fig. 53.

It has been pointed out that the automatically functioning direct drive is effected when port 98 in tube 62 of valve V61 comes into alignment with the opening of duct 30 leading to turbine-compartment 14 of this drive. To maintain this alignment under an increasing speed of the car, means will have to be provided to counteract the tendency of the increasing head under plunger 52 to carry this member and its associated tube 62, farther and farther upwards. The simplest means for this purpose consists in the provision of a port 150 in tube 50 of the gage, so located that when port 98 assumes a perfect alignment with duct 30 the bottom of the plunger 52 has just cleared said port 150, uncovering it entirely, so that the fluid that actuates the plunger escapes back into the transmission housing, and further in making the plunger 52 of such vertical extent that when it has cleared the port 150, its upper end will contact the cap 90, whereby further upward movement of the plunger is prevented.

Having thus described the manner of using a fluid pressure gage as a means responsive to the speed of the driven shaft in association with valve V61 which is concerned with the establishment of the continuously variable transmission, I shall now take up the adaptation of an ordinary governor of any suitable type as a possible, though less manageable, substitute for said fluid pressure gage. Referring to Figs. 45 and 46 which illustrate a fly-ball governor it will be seen that spindle 152 thereof is operated by the driven shaft 8c through gears 154 and 156 mounted on said spindle and said driven shaft respectively. The relative size of these two gears depends upon the relative speed it is desired to impart to the governor. Yoke 158 carries sleeve 160 which is tied to valve tube 62c through cross-link 70c. As the centrifugal force imparted to the flyballs by the revolving driven shaft carries upwards yoke 158 and sleeve 160, valve-tube 62c is carried in the same direction and, as the driven shaft slows down and the centrifugal force diminishes, yoke 158 and sleeve 160 descend carrying the valve-tube along. Yoke 158 presents a groove engaging ring 162 which is connected with links 164 so that the sleeve 160 which is attached to the yoke, and consequently must move with it up and down, will not have to revolve; revolving of sleeve 160, it will be gathered from an examination of Fig. 45, would be impossible because of its connection with tube 62c through cross-link 70c. Adjustable collar 166 held in position by means of screw 168 is intended to check the upward movement of yoke 158 when port 98 of the direct drive comes into alignment with the opening of duct 30c of the same drive.

Having described the fluid-propelling means and fluid-propelled means of the transmission and also the means responsive to the speed of the driven shaft in association with the valve which is instrumental in bringing about a var'able ratio between the speed of this shaft and that of the driving shaft, I shall now take up the remaining parts of the device used in conjunction with the above mentioned means for operating the vehicle.

I have stated hereinabove that the operating fluid courses from the fluid-propelling means 12 to the control valve mechanism 40, also marked C. V. M., through duct 38; this is best shown in Fig. 3. Referring to Fig. 19 it will be seen that this control valve mechanism consists of two parts; an upper valve made up of plug 170 and the upper part of common casing 172, and a lower valve made up of plug 174 and the lower part of this common casing 172, the two plugs being separated by a diaphragm 176, which is an extension of said common casing. This diaphragm is shown in detail in Fig. 22, which is a cross section of Fig. 19 on line 22—22.

Upper valve plug 170 is operated by handlever 178, shown in Figs. 1 and 2, through shaft 180, and is concerned in setting the course of the operating fluid either to the forward drive means, or to the reverse drive means or to a neutral port that returns the fluid directly into the transmission housing. This plug, to which I shall hereinafter refer as "manually operated valve-plug" or "drive-setting valve-plug," is held in its seat on the diaphragm 176 in casing 172 by means of cap 182 which causes spring 184 to press against said plug. As just stated, its function is to set the course of the operating fluid for the forward drive or the reverse drive; when the valve-plug is set in neutral the transmission is not "in speed." This function of the valve-plug is performed through channel 186 which runs through its body and is elbow-shaped. The approximately vertical arm of this channel is in permanent alignment with port 188 in diaphragm 176 which is shown in detail in Fig. 22; the other, approximately horizontal, arm of the channel assumes its various functional positions when the plug is turned for this purpose. In Fig. 19 this last arm is shown directed to neutral port 190, also marked N for easier identification of function, causing the operating fluid to escape straight back into the transmission housing; under this condition the car is not running. This neutral position is better shown in Fig. 25 which is a cross section of Fig. 19 along line 25—25. In Fig. 26 the plug is shown turned to the reverse drive duct 42 which is also marked R.; in Fig. 27 the plug is shown turned for the automatically functioning, continuously variable forward drive, that is, to duct 44 which is also marked F; and in Fig. 28 it is shown turned to another neutral port 191, also marked f, this being the position assumed by the plug when handlever 178 is set for the manually effected, non-automatic, auxiliary, direct drive which is independent of the automatic direct drive forming part of said automatically functioning, continuously variable forward drive.

As stated before, this drive-setting plug 170 is operated by handlever 178 through shaft 180. Handlever 178 moves along dial or quadrant 192, which is positioned in a plane preferably, but not necessarily, parallel with steering wheel 194. For operating purposes this dial is divided into four zones: (1) zone N for the neutral position of the handlever; (2) zone F for the automatically functioning, continuously variable forward drive, indirect and direct; (3) zone R for the reverse drive, and (4) zone f for the manually effected, non-automatic, auxiliary direct drive to be used only in certain emergencies as will be explained hereinafter. To prevent an accidental shifting of lever 178 from zone F to zone f this member is provided with a spring-controlled pin 195, which will negotiate impediment 197 having the form of a boss, only when sufficient force is applied for this purpose to said lever.

Returning now to the lower valve of the control valve mechanism it will be seen, by referring more especially to Fig. 14, that plug 174, which is held in its seat in the casing 172 by cap 196 which presses against spring 198, presents a channel 200, which on its left side is in permanent communication with duct 38 coming from the fluid propelling means 12, as shown in Fig. 3. This channel 200 runs axially up to about the middle of the plug 174 where it turns radially and runs to the surface thereof; for better identification I will designate this second part of the channel as 200A. After reaching the surface, the channel, now open, turns circumferentially as shown in Figs. 19-21 and all of the ten figures, 29-33A; I shall designate this third part of the channel as 200B.

Referring first to Figs. 19-21 and then to Fig. 6, which shows an arrangement of parts identical with that intended to be used in the embodiment of Fig. 1 although not fully illustrated in connection therewith, it will be gathered that valve-plug 174 is turned, for operative purposes, in the direction indicated by the arrow of Figs. 19-21 through foot-pedal 202, shaft 204 which passes through floor board 203 and a system of levers, 206, 206A, 206B and 206C', this last lever being connected to said plug by means of lug 208'; it should be added that the same foot pedal 202 is used to actuate gas throttle rod 210 through shaft 204 and bracket 218 secured to shaft 204 in any suitable or preferred manner as by a pin or screw 220. As this gas throttle rod 210 must be depressed progressively during acceleration it follows that valve-plug 174 will have to turn considerably because of the common linkage to foot-pedal 202; consequently, part 200B of channel 200 will have to be elongated circumferentially as shown in the pertinent figures.

It should therefore be borne in mind that the controlling of operating valve 174 and the controlling of gas throttle rod 210 are reduced to one joint operation through foot-pedal 202.

In Fig. 19 valve-plug 174 is shown in its non-actuated, or rest position wherein part 200A of its channel is in full communication with neutral port 212 in the valve casing. In this position of the plug, if the engine is running, the operating fluid escapes straight back into the transmission housing through said neutral port 212 without transmitting any power to the driven or load end. If, now, this valve-plug is actuated, that is, turned, in the direction of the arrow through foot-pedal 202, channel-part 200B will come into alignment with port 188 in diaphragm 176 of the mechanism so that the operating fluid will be diverted from neutral port 212, which becomes obstructed, to channel 186 in the drive-setting, hand-operated, valve-plug 170. If this last plug is in neutral position, as shown in Fig. 19, the engine will still idle and will not transmit power to the driven end since the operating fluid again escapes straight back into the transmission housing through neutral port 190 (N); however, because gas throttle rod 210 has been depressed together with foot-pedal 202, the engine will idle at a higher speed. This feature makes it possible to use one single foot-pedal for accelerated idling of the engine and for actuating the driven end, that is, for operating the car "in speed."

To insure against the operating fluid following the line of least resistance and thus escaping through neutral port 212 when valve-plug 174 is being gradually actuated and also to insure against the operating fluid being suddenly diverted to channel 186 when the actuating of said valve-plug is completed and thus causing jarring, channel-part 200B may be tapered downwards at its lower end 213, or said neutral port 212 may be tapered upwards at its upper side 215 or both these expedients may be used, as shown in Figs. 20 and 21.

Because of the means used to turn it and because of its function, I shall hereinafter refer to valve-plug 174 as the "foot operated" or "operating" valve-plug. Likewise, because pedal 202 performs the above mentioned double duty I shall refer to it as "foot-pedal-gas-accelerator" when this tends to clarify matters.

By means of adjusting nuts 217 and 219 on gas accelerator rod 210 and adjusting nut 223 on shaft 204 which connects foot-pedal 202 with operating valve levers 206—206C', it is possible to adjust the relation between said gas accelerator and said operating valve so that either one of these two members may be actuated slightly ahead of the other or so that both may be actuated simultaneously.

It is understood that some suitable means, such as spring 225 on lever 206B, for example, will be provided to cause arm 206C' and, consequently, operating valve plug 174, to return automatically to the neutral position when free to do so. Referring to Figs. 6 and 12, it will be seen that lever 206B transmits its movement to lever 206C', which is located outside of housing 2, and consequently to lever 206C, which is located inside of said housing 2, these latter levers 206C' and 206C being held rigidly together by a lug which appears as member 208' in Fig. 6 and as member 208 in Fig. 12, this differentiation in the numerals being rendered necessary by the fact that the two figures represent different forms of the invention in which similar parts are used.

It is thus seen that, with the arrangement just described, if drive-setting plug 170 is in neutral position as shown in Figs. 19 and 25, that is, if handlever 178 is in neutral zone N, depressing foot-pedal-gas-accelerator 202 will simply lead to an accelerated idling of the engine; if, on the other hand, this drive-setting plug 170 is set in one of the operating positions disclosed in Figs. 26, 27 or 28 through setting said handlever in the corresponding position R, or F or f indicated on dial 192, then the driven end of the vehicle will be actuated. Consequently, once valve-plug 170 is set for the desired drive, the operator is concerned exclusively with the foot-pedal-gas-accelerator which becomes a mere gas accelerator.

Conversely, if drive-setting plug 170 is set for either the forward or the reverse drive and the car is running because operating valve-plug 174 is turned in the direction of the arrow so that the operating fluid is being delivered to channel 186, removing the pressure from the foot-pedal-gas-accelerator 202 will return this operating valve-plug 174, through the action of spring 225 to the position of rest wherein the operating fluid returns straight back into the transmission housing through port 212.

In connection with this last feature of the transmission it must be emphasized that if the deceleration is gradual, that is, if operating valve-plug 174 is allowed to return slowly to its neutral position, the operating fluid will have time to change its course from the front or direct drive side of the piston-and-cylinder arrangement 108—106, Fig. 3, to the rear or indirect drive side of this arrangement and so cause the disengaging of the positive clutch members 116—118; if, however, plug 174 is allowed to return suddenly to the neutral position so that the operating fluid is diverted straight back into the transmission housing through neutral port 212 and thus fails to reach the rear side of said piston-and-cylinder arrangement the positive clutch members remain engaged and the transmission remains in the direct drive instead of returning to neutral. To circumvent such a situation, rod 110 of the direct drive mechanism is provided with an obturator 221, which during the direct drive rests in, and occludes, said neutral port 212. As operating valve-plug 174 returns suddenly to neutral position and channel 200B assumes the position disclosed in Fig. 19 the operating fluid directed against port 212, forces the obturator out of said port, thus causing rod 110 to move forwards and bring about the disengagement of clutch members 116 and 118.

I have stated hereinabove that the transmission may be used for car-braking purposes through the action of the operating fluid upon the driven shaft. It will be observed that while the vehicle is running in the forward drive the reverse drive turbine 22 functions as a centrifugal pump because it is running in the direction opposite to that in which it is intended to operate. It should be remembered that a centrifugal pump is essentially an inward flow turbine reversed; in a turbine the fluid enters at the periphery and is discharged at the center or "eye" while in a centrifugal pump the fluid enters at the center or "eye" and is discharged at the periphery. Likewise, during the reverse drive the forward drive turbine-sections 14—20 will, in their turn, act as centrifugal pumps because they also will be running in the direction opposite to that in which they are intended to operate. Referring to Figs. 1 and 3 it will be observed that during the forward drive the reverse drive turbine 22 acting as a centrifugal pump because running in the opposite direction to that in which it is intended to run in the reverse drive, will suck in operating fluid at its "eye" 222 and propel it through its duct 42 to control valve mechanism 40 where it will be stopped by drive-setting valve-plug 170 unless provision is made in the form of a bypass 224, for its passage through this plug, as shown in Fig. 27.

Likewise, during the reverse drive, forward drive turbine-sections 16—20, Fig. 1, will suck in operating fluid through indirect drive duct 104 which runs to cylinder 106, Fig. 3, this cylinder being now open through its port 120. It should be noted that, while direct drive turbine-section 14 is also turning in the direction opposite to that in which it is intended to operate and consequently has also a tendency to operate as a centrifugal pump, it is not effectively active because during the reverse drive port 122, in cylinder 106, is obstructed by piston 108; furthermore, during the reverse drive duct 30, Fig. 1, leading to this turbine-section 14, is sealed by segment 100 of tube 62 of valve V61. The operating fluid sucked in by the forward indirect drive turbine-compartments 16—20 from the transmission housing through port 120, cylinder 106 and duct 104 will be propelled into tube 62 of valve V61 thence through duct 44 to control valve mechanism 40, Fig. 3, where it will be stopped by drive-setting valve-plug 170 unless provision is again made in the form of a bypass 226, as shown in Fig. 26, for its passage through this plug.

Therefore, two bypasses will have to be provided in the drive-setting valve-plug 170, for the escape of this operating fluid expelled from the turbines when they function as centrifugal pumps because reversed: bypass 224 for the escape of the operating fluid rushing in through duct 42 (R) during the forward drive and bypass 226 for the escape of the operating fluid rushing in through duct 44 (F) during the reverse drive. These bypasses 224 and 226 are cut out in the lower part of the plug as will be readily understood by referring to Figs. 39-41, Fig. 39 being a view of this plug from underneath and Fig. 40 a cross section of this same plug at the level of the line 40—40 of Fig. 41 which is a developed view of the outer surface of the same member.

During the forward drive the operating fluid coming from the reverse drive turbine through duct 42 (R), as shown in Fig. 27, will therefore course through bypass 224 in plug 170 as just stated, then through port 228 in the diaphragm 176 separating the two valve-plugs 170 and 174 and shown in dotted lines in Fig. 32, towards the lower of these plugs, that is, operating plug 174, where it would again be stopped unless provision is made for its escape into the transmission housing, this provision consisting in bypass 232 shown in Figs. 32 and 32A and the elongated port 232A in the casing 172 (see Figs. 19A and 19B). Figs. 32 and 32A are set underneath Fig. 27 so as to better bring out the operative relation between drive-setting valve and operating valve in their functional positions.

Likewise, during the reverse drive, the operating fluid coming from the forward drive turbine-compartments 16—20 through duct 44 (F) as shown in Fig. 26, will course through bypass 226 in plug 170 as stated before, then through port 230 in the above mentioned diaphragm shown in dotted line in Fig. 31 and escape into the transmission housing through bypass 234, Figs. 31 and 31A, provided for this purpose, in operating valve-plug 174 and through elongated port 234A in the casing 172 (see Figs. 12 and 19A). The diaphragm 176 is better shown in Fig. 22 which is a cross section of Fig. 19 on line 22—22; the two bypasses 232 and 234, cut out in the operating valve-plug, will be better understood by referring to Figs. 16, 17, 19A, 23, 24 and 42.

Attention is called to fact that bypasses 232 and 234 in the operating valve-plug must be elongated circumferentially, as shown in the various pertinent figures, such as Fig. 29, because this valve-plug is linked through lever system 206C—206 and shaft 204, Fig. 6, to gas throttle lever 210 which is depressed progressively, as already explained in connection with elongated channel 200B, Figs. 19-21. Attention is called to the fact that, because of the same reason, ports 232A and 234A will likewise have to be elongated.

Now, inasmuch as the reverse drive turbine acts as a centrifugal pump during the forward drive because reversed, and inasmuch as the operating fluid coming from this propelling means must meet with no hindrance in its course back to the transmission housing through both valve-plugs, as explained above, it is obvious that any obstacle placed in the path of this fluid will tend to retard the revolving of the reverse drive turbine-vane and thus act as a brake upon the driven shaft upon which this turbine-vane is mounted. Advantage may therefore be taken of this condition to use it as a means for braking the car when, under certain situations, dependence cannot be placed entirely upon the brakes. To obtain a braking effect upon the driven shaft during the forward drive through the action of the operating fluid ejected by the reverse drive turbine it is only necessary to reduce the pressure upon the foot-pedal-gas-accelerator 202 thereby allowing operating valve-plug 174 to return, through the influence of spring 225, Fig. 6, to a less actuated position wherein the overlapping of bypass 232 and port 228 in diaphragm 176, as shown in Fig. 32, is rather limited so that the operating fluid will escape with only moderate speed as compared to the condition shown in Fig. 32A where, because of a more actuated position of valve-plug 174, the overlapping is adequate so that the fluid may run off freely.

The above remarks are equally applicable to braking during the reverse drive.

It is advisable that some overlapping between bypass 232 and port 228, and also some overlapping between bypass 234 and port 230, should exist even in the neutral position of operating valve-plug 174, as shown in Fig. 29, otherwise the vehicle would come to an abrupt stop in the event this valve-plug is allowed to suddenly return to the position of rest when the foot is removed from the gas accelerator, because the operating fluid evacuated from the reverse drive turbine during the forward drive, and from the forward drive turbine during the reverse drive, would be interfered with suddenly and completely and this would tend to act as a violent braking upon the driven shaft.

It is also advisable that even in the neutral position of drive-setting valve-plug 170, Fig. 25, some slight communication should exist between reverse drive duct 42 (R) and diaphragm port 228 through bypass 224 where angle 236 of the valve casing is shown cut away, and some slight communication also between forward drive duct 44 (F) and diaphragm port 230 through bypass 226 where angle 238 of the same casing is likewise shown cut away. This provision will be useful when the car is to be pushed while in neutral and the turbines, turning over, eject a certain amount of operating fluid because they are reversed. In the absence of these provisions the vehicle would have to be put in speed before moving it in either direction.

I have stated that the direct drive, while functioning in a fully automatic manner, may be brought under the full control of the operator should conditions demand it as, for instance, when the car stalls in this drive and it becomes necessary to return the transmission to the neutral condition for starting the engine, or when the starting apparatus is out of order and it becomes necessary to start the engine through putting the car in the direct drive and pushing it.

The means for bringing the direct drive mechanism under the control of the operator consists in establishing a link between handlever 178 and rod 110 of said direct drive mechanism through shaft 180, a cam 240 mounted on this shaft, and a system of members intermediate said cam 240 and rod 110, as shown in Fig. 12. Referring first to explanatory diagrammatic Figs. 34-38, it will be seen that the periphery of cam 240 presents a high zone 250 and a low zone 252. Fig. 34 discloses the relation between the cam and the mechanism of the direct drive during the reverse drive. While this cam is in no way concerned in the establishing or functioning of this reverse drive the contact of its high zone point R with roller 242 of the direct drive mechanism prevents the accidental backsliding of rod 110 that would cause the engaging of positive clutch members 116 and 118 during said reverse drive. During the reverse drive also, roller 244 carried by one arm of bell-crank lever 248 which pivots about its pin 256 is accommodated in the low zone 252 of the cam. The same relation between the cam and rollers 242 and 244 obtains during the neutral condition of the transmission, as shown in Fig. 35; hence an accidental engaging of the positive clutch of the direct drive during neutral is again impossible. Figs. 36 and 37 disclose the relation between the cam and the two rollers during the automatically functioning forward drive. It will be noted in these two figures that, while roller 244 is still accommodated in low zone 252, the position of the cam is now such that roller 242 may also, if necessary, be accommodated in this zone. In Fig. 36 roller 242 is separated from the low zone by space 254; this space exists there because of the change in the position of the cam. The transmission is now in the fluid, indirect, low drive as disclosed in Fig. 3 wherein the operating fluid courses through indirect drive duct 104 (I) to cylinder 106 where it forces piston 108 forwards and escapes through port 120. If, presently, because of a higher speed of the driven shaft, the operating fluid is compelled to flow through direct drive turbine-compartment 14 and duct 102 (D), it will reach the other end of the cylinder 106, strike piston 108 on its front side and force it backwards; this will carry rod 110 of the direct drive mechanism in the same direction, as shown in Fig. 37, so that roller 242 will come to occupy space 254 shown vacant in Fig. 36. Hence, once handlever 178 has been set in zone F of the automatically functioning forward drive, cam 240 assumes a position wherein the mechanism of the direct drive is free to move forwards and backwards, without interference therefrom, for the indirect and direct drives.

Thus far the function of lever 248 has been a passive one; when, however, handlever 178 is set in zone f which is reserved for the manually effected, auxiliary, direct drive, cam 240 assumes the position disclosed in Fig. 38 wherein its high zone 250 comes in contact with, and impinges upon, roller 244 of this lever 248 forcing it to turn about on its pin 256. Under this condition the extremity of arm 248A of lever 248 strikes against shoulder 260 of arm 262, carrying this member backwards together with rod 110 of the direct drive with which it is connected, thus bringing positive clutch members 116 and 118 into engagement for this drive.

Fig. 12, in which like numerals as in Figs. 34-38 refer to like parts as in these five diagrammatic figures, is a side elevation of cam 240 and the various members forming part of the direct drive arrangement in their relation to the control valve mechanism to which they are attached through plate or bracket 124. This plate 124, which is also shown in Figs. 3 and 13, brings about a perfect alignment between the various parts, this being necessary for the best results in the functioning of the mechanism.

Referring more particularly to this Fig. 12 it will be seen that arm 262 is carried by, and moves longitudinally on, shaft 268 which in turn is fixedly mounted in brackets 270 and 272 forming part of said plate 124. Lower part 262A of arm 262 is bifurcated and engages a groove in collar 266 attached to rod 110 of the direct drive mechanism. The end of arm 248A of lever 248, when said lever turns about its pin 256, as already stated, engages front side of arm 262 which appears as shoulder 260 in the diagrammatic Figures 34 to 38 and carries this arm, together with rod 110, rearwards, thus bringing about the manually effected direct drive.

It will thus be seen that the movements of rod 110, which is responsible for bringing into engagement clutch members 116 and 118 in the direct drive and for keeping these members in disengaged position under all other conditions, are well regulated in the following manner: During the reverse drive and during the neutral condition of the transmission, by the contact of roller 242 with points R and N of high zone 250 of the cam; during the low, indirect forward drive, by the operating fluid striking the posterior surface of piston 108 of the direct drive mechanism; for effecting and maintaining the automatically functioning direct drive, by the operating fluid striking the anterior surface of the same piston; for establishing the auxiliary, manually effected, direct drive, by high zone 250 of cam 240 impinging upon roller 244, and, finally, for returning the transmission suddenly from the direct drive to neutral without the intervention of the indirect forward drive, by the impact of the operating fluid forcing obturator 221 out of neutral port 212 thus forcing rod 110 forwards.

Since the auxiliary, manually effected direct drive is used for a definite purpose, as explained above, and not for routine operating, it must be discontinued as soon as the emergency is over or else the transmission will not function in an automatic manner. Conversely, should the vehicle stall in the direct drive, it is natural that the transmission will have to be returned to the neutral state before any attempt at starting the motor is made, that is, handlever 178 will have to be returned to zone N on the dial; this will cause cam 240 to assume the position shown in Fig. 35 wherein point N (neutral) on its high zone will come in contact with, and impinge upon, roller 242, forcing it forwards and thus causing the disengaging of clutch members 116 and 118 of the direct drive.

It is of utmost importance to remember that the manually effected, auxiliary, direct drive is apt to be used mostly, as already pointed out, when the starting apparatus is out of order and it may become necessary to crank the engine through putting the transmission in the direct drive and rolling the car. As this last action is usually performed through the application of force coming from outside assistance the operator will very likely fail to depress foot-pedal-gas-eccelerator 202; this will result in operating valve-plug 174 remaining in the position of rest as shown in Fig. 19 wherein the operating fluid coming through duct 200—200A—200B, as the engine starts to turn over, would be directed against port 212 only to find this exit sealed by obturator 221, since the transmission is now in the direct drive. As this would check the further turning over of the engine and may also result in damage, valve-plug 174 may be automatically actuated, to the position shown in Fig. 20, by means of a pivoted link 274 carried by arm 262 which link is arranged to impinge upon actuating lever 206C, Fig. 12, when said arm and rod 110 are shifted rearwards in the process of effecting the direct drive. The link 274 is shown as provided with a slotted end 275 adapted to receive pin 275A in the end of crank 206C, and the slotted end is guided in an arc by a pin 275B therein traveling in a slot 275C on the outside of casing 172. This will result in directing the operating fluid to port 188 and channel 186, thence through neutral port 191 (f), Fig. 28, back into the transmission housing. As all the operating fluid propelled during the manually effected direct drive thus escapes through this neutral port 191 (f), no such fluid will reach any of the turbine-compartments F of the automatic forward drive so that no interference of any kind is to be expected from that part of the transmission.

As to the operating fluid ejected during the manually effected direct drive by the reverse drive turbine, which is functioning as a centrifugal pump because reversed as already explained, reference to Fig. 28 will show that it escapes back into the transmission housing through neutral port 190 (N), as indicated by the curved arrow.

In the manually effected direct drive the speed-responsive device, G49, may be allowed to perform its function the same as during the automatically functioning forward drive since no operating fluid reaches the forward drive turbines F; during the reverse drive, however, this is not desirable so that provision must be made for suspending the effect of its functioning upon valve V61. The simplest and most effective means in this regard consists in an adequate port, 276, in tube 50b of the gage as shown in Fig. 43, through which the fluid coming from the small centrifugal pump 48b of this gage may escape before it can affect the position of plunger 52b through striking its lower end. During the forward drive, automatic or manual, this port 276 is sealed by sleeve 278 as shown in Fig. 47; this sleeve is carried by gear 280b which is in constant mesh with gear 282b carried by shaft 180b as shown in Fig. 44 (corresponding respectively to parts 280, 282 and 180 of Fig. 3). As handlever 178 is set in the reverse drive zone R, gear 282b through gear 280b turns sleeve 278, Fig. 44, so that port 284 in this sleeve, comes into alignment with port 276 in tube 50b thus allowing the fluid to escape.

Having fully described the form of my invention wherein the fluid-propelled means actuating the driven shaft is built to be susceptible to a variation of its effective volume, this variation being used to obtain a variable power transmission, I shall now take up the form wherein the fluid-propelling means is built to be susceptible to a variation of its effective capacity, to be used for the same purpose, bearing in mind, however, that the greater part of the rest of the transmission mechanism remains not much affected in this modified form of the device.

Referring to Fig. 6 which is a longitudinal view, partly in section, of the form of my invention wherein the fluid-propelling means is constructed to be susceptible to a variation of its effective capacity, it will be seen that centrifugal pump 12', which constitutes the propelling part of the device, is composed of two compartments, 286 and 288. More than two compartments may be used, as will be gathered after the functioning of the structure is understood, but this is not necessary. Compartment 286 receives the operating fluid directly through "eye" 24' as soon as the centrifugal pump impeller begins to revolve with crankshaft 4' on which it is mounted; compartment 288, however, receives the operating fluid through duct 290 and valve V293 and this only when the driven shaft has reached a definite speed; this will become clear as the description proceeds. Valve V293 is made up of an outer tube, 294, and an inner tube, 296, open at both ends. Outer tube 294 is attached to duct 290 leading to compartment 288 of the centrifugal pump; inner tube 296 is linked to plunger 52' of the speed registering gage G49' through link 70' and presents port 298 in the lower part of its wall. With the engine not running, or running at a very moderate speed, valve tube 296 is in the position shown in Fig. 6. When, however, under the influence of an increasing speed of the driven shaft plunger 52' and valve tube 296 climb up, port 298 in this last tube comes into alignment with opening 300 which is common to duct 290 and to outer tube 294 so that the operating fluid may now flood pump-compartment 288. Under this condition compartment 288 also becomes effective so that a larger amount of operating fluid will be propelled by the centrifugal pump into the fluid-propelled means for each revolution of the crankshaft, thus resulting in a higher speed of the driven shaft.

Springs 72' and 302, intended to counteract the head developed by the centrifugal pump 48' of the gage, are held in position by caps 90' and 88' which present ports 74 and 303. The function of port 74 has already been explained; the function of port 303 is to prevent the accumulation of air in the upper part of valve V293. It is thus seen that speed gage G49' and valve V293 impart to the propelling part of the device a variable effective capacity, this resulting in a variable power transmission.

Because in this form of the invention the fluid-propelled means F is not divided into sections as in the first form, certain changes will have to be introduced in the manner of bringing about, and discontinuing, the direct drive. In the first form of the invention a compartment, 14F, was set aside for this purpose; in the present form of the invention, Fig. 6, the direct drive is brought about in the following manner: the operating fluid escaping from the forward drive turbine 292 (F) runs in the direction shown by the arrows into cylinder 304 which forms part of the direct drive mechanism, through duct 306 which is connected with outer cylinder 308 encasing said cylinder 304. This last cylinder (304) presents three ports as shown in Fig. 10 which is a developed view thereof. The operative relation between inner cylinder 304, outer cylinder 308 and cylinder 106' of the piston-and-cylinder arrangement 106'—108', with which we are already familiar, is disclosed in Figs. 8 and 9, Fig. 8 being a cross section of these members on line 8—8 of Fig. 6, and Fig. 9 a cross section of the same members on line 9—9 of Fig. 6. Through circumferentially elongated port 310 the operating fluid coming from duct 306 is admitted into cylinder 304 as stated above; through port 314 of this cylinder and common port 316 in cylinders 308 and 106' the operating fluid is admitted to the rear side of piston 108', so that this piston is forced forwards, the fluid finally escaping through port 120'. This results in the indirect drive because clutch members 116' and 118' are compelled to remain in the disengaged position. As the speed of the driven shaft increases and valve-tube 296 climbs up, inner cylinder 304 is rotated through the medium of lever system 318 which is connected on one side with this cylinder 304 and on the other side with valve tube 296. Lever system 318 is shown in detail in Fig. 7. The rotating of cylinder 304 brought about by the increased speed of the driven shaft and the climbing up of valve-tube 296 results in port 314 moving out of alignment with common port 316 and in the other port, 312, coming into alignment with common port 320 of cylinders 308 and 106' so that piston 108', struck on its front side by the onrushing operating fluid is shifted rearwards, thus bringing about the direct drive.

With respect to the means of bringing about the direct drive in the two forms of the invention, the advantage lies with the method brought out in the first form of the invention, as shown in Figs. 1 and 3, wherein a special turbine-compartment 14F, is set aside for the purpose. Considered, however, from another point of view, the second form of the invention had an advantage over the first form inasmuch as it offers a variable transmission not only for the forward drive but also for the reverse drive, since the means for establishing a variable transmission in this second form is in the propelling means which is common to the forward and to the reverse drives, while in the first form the benefit of a variable transmission is limited to the forward drive.

The third form of the invention consists in bringing together the two forms described above through the medium of the speed responsive device G49a actuating, in combination, tubular valve V61a and tubular valve V293 as disclosed in Fig. 4 and also in Fig. 5, which is a horizontal cross section of Fig. 4 on line 5—5. In this third form of the invention the propelling part of the transmission, including valve V293a, is borrowed from the form disclosed in Fig. 6, while the propelled part of the transmission, including valve V61a, is borrowed from the first form of the invention disclosed in Figs. 1 and 3. Referring to Fig. 5 it will be seen that inner tube 52a of gage G49a is linked to inner tubes 62a and 296a of valves V61a and V293a through ties 70a.

Concretely described, an illustrative embodiment of this third form of my invention will be substantially as shown in Figs. 1 and 3, except that the speed responsive device G49 and the tubular valves V61 are replaced by the device G49a of Figs. 4 and 5, which operates the two tubular valves V61a, corresponding to valve V61 of Fig. 1, and V293a, corresponding to V293 of Fig. 6, and the propelling parts of the transmission, including parts 12, 13, 24 and 25, will be replaced by parts 12', 24', 286 and 288 of Fig. 6. Duct 38 remains to effect connection between the propelling parts and the control valve 40, while duct 290 is added to effect connection between the tubular valve V293a and the compartment 288. The clutch members 116 and 118 and their operating parts remain as shown in Figure 1.

It will be obvious that in operation the tubular valves V61a and V293a, because of their interconnection by the ties 70a, function simultaneously, the former varying the capacity of the fluid motor as described in connection with the embodiment of Figs. 1 and 3, while the latter varies the capacity of the pump, as described in connection with the embodiment of Fig. 6. All the other parts function as described in connection with the first embodiment.

Obviously either the clutch-operating mechanism of Fig. 3 or that of Fig. 6 could be used with the speed-responsive device of Figs. 4 and 5 to effect the direct drive.

While ordinarily the first two simpler forms of my invention will be found preferable, for particular purposes this third form of my invention may be found of equal utility or even preferable to the other two forms.

It should be understood that the various forms of my invention herein presented constitute illustrative embodiments and that many variations thereof, of the parts and their association may be made without departing from the spirit of the invention. It will further be understood that the disclosure herein is intended to be illustrative merely and is not to be interpreted in a limiting sense and that I do not limit myself other than as called for by the language of the appended claims.

Having described my invention and illustrated its use, what I claim as new and desire to secure by Letters Patent is:

1. In a power transmission device, a driving shaft, a system of fluid-propelling units actuated by said driving shaft, a driven shaft, a system of fluid-propelled units driven by fluid from said fluid-propelling units actuating said driven shaft, means responsive to the speed of the driven shaft, and means, in association with said means responsive to the speed of the driven shaft, varying the amount of operating fluid propelled by said system of fluid-propelling units per revolution of the crankshaft thus varying the impact upon the unit of area of the fluid-propelled units and means for varying the impact upon the unit of area of said system of fluid-propelled units in addition to the varying of said impact derived from the fluid-propelling means.

2. In a power transmission device, in combination, a driving member, fluid-propelling means actuated by said driving member, a driven member, fluid-propelled means driven by fluid from said fluid-propelling means actuating said driven member, means for varying the ratio of effective volume of the fluid-propelled means and fluid-propelling means, an operative connection between said fluid-propelled means and said fluid-propelling means for the circulation of operating fluid in the effecting of forward drive and reverse drive, drive-setting valve means intermediate said fluid-propelling means and said fluid-propelled means for directing the operating fluid to a neutral outlet, or to the means effecting the forward drive or the reverse drive, and operating valve means for diverting the operating fluid from a neutral outlet to said drive-setting valve means.

3. In a power transmission device, a driving member, fluid-propelling means actuated by said driving member, a driven member, fluid-propelled means actuating said driven member, operative connection between said fluid-propelling means and said fluid-propelled means for the circulation of operating fluid, a drive-setting valve in the path of said operative connection, an operative valve for regulating the flow of the operating fluid from said fluid-propelling means to said drive-setting valve, a gas throttle, means for jointly actuating said operating valve and said gas throttle, and means for adjusting the operative relation between the means for actuating said operating valve and said gas throttle.

4. In a power transmission device, a driving member, fluid-propelling means actuated by said driving member, a driven member, fluid-propelled means driven by fluid from said fluid-propelling means actuating said driven member, an operative connection between said fluid-propelling means and said fluid-propelled means for the circulation of the operating fluid, means responsive to the speed of the driven member, valve means in association with said means responsive to the speed of the driven member effecting an automatic, variable, indirect forward drive and contributing in the effecting of an automatic direct drive, a clutch effecting said automatic direct drive, and a piston-and-cylinder arrangement in which the piston is in operative connection with said clutch effecting the direct drive and the cylinder is in operative connection with the outlet means of said fluid-propelled means causing the operating fluid evacuated from said fluid-propelled means to shift said piston in one direction, above a certain speed of the driven member and thus causing the effecting of the direct drive, and in the opposite direction, below that certain speed of the driven member, to thus cause the discontinuing of the direct drive and the effecting of the indirect drive.

5. In a power transmission device, a driving shaft, fluid-propelling means actuated by said driving shaft, a driven shaft, fluid-propelled means driven by fluid from said fluid-propelling means actuating said driven shaft, means responsive to the speed of the driven shaft, means in association with said means responsive to the speed of the driven shaft establishing a variable indirect drive and contributing in the effecting of a direct drive, a clutch effecting said direct drive, a movable member in operative connection with said clutch effecting the direct drive and in operative relation with said fluid-propelled means causing the operating fluid evacuated from said fluid-propelled means to move said movable member in one direction above a certain speed of the driven shaft and thus cause the effecting of the direct drive, and in the opposite direction below that certain speed of the driven shaft, to thus cause the discontinuing of the direct drive and cause the establishing of the indirect drive.

6. A variable power transmission comprising a rotatable driving member, means actuated by said driving member for generating a flow of fluid, a rotatable driven member, means of variable capacity adapted for actuation by said flow of fluid for rotating said driven member in the same direction as said driving member, means of fixed capacity adapted for actuation by said flow of fluid for rotating said driven member in the same direction as said driving member, means adapted for actuation by said flow of fluid for rotating said driven member in the reverse direction, control means for directing said flow of fluid selectively either to said first two fluid actuated means or to said last-mentioned fluid actuated means or to cause its inactive discharge, and means responsive to the speed of said driven member for controlling said variable capacity fluid actuated means so as to vary the speed ratio between said driving member and the driven member in a predetermined manner.

7. In a power transmission, a driving member, a driven member, means actuated by said driving member for generating a flow of fluid, a first means actuated by said fluid for actuating said driven member so as to cause it to rotate in the same direction as said driving member, a second means actuated by said fluid for actuating said driven member so as to cause it to rotate in the opposite direction, direct-drive means for connecting said driving and driven members, means responsive to the speed of the driven member when this latter member is actuated by said first means actuated by said fluid, and means, in association with said means responsive to the speed of the driven member, for controlling the flow of the fluid so as to vary the speed ratio between said driving member and said driven member in accordance with the requirements of speed and load, and also so as to cause the above mentioned direct-drive connecting means to effect a direct drive connection between said driving and driven members when said driven member attains a predetermined speed, manually controlled drive-setting means adapted for selective setting into a position for an automatically functioning forward, indirect and direct, drive, in which it directs the fluid from said fluid-flow-generating means to said first fluid-actuated means, or into a position for a reverse drive in which it directs the fluid to said second fluid-actuated means while at the same time rendering said speed-responsive means inactive, or into a neutral position in which it causes the fluid to discharge inactively, or into a position for a manual, auxiliary direct drive, control means for simultaneously regulating the power input into said driving member and the flow of the fluid from said generating means to said two driven means for operating the vehicle and for regulating the return flow of the fluid from the same two driven means for producing a braking effect upon said driven member, means for causing said control means to return to an inactive, neutral position when released, and means for discontinuing said direct drive and for returning the transmission directly and instantaneously to its neutral position when said control means is suddenly allowed to return to its neutral, inactive, position during the automatically functioning direct drive.

8. A power transmission of the fluid type comprising a rotatable driving shaft, a rotatable driven shaft, means for generating a flow of fluid actuated by said driving shaft, means for receiving said fluid and being actuated thereby to impart rotation to said driven shaft, and one of said means comprising a section of variable capacity, whereby when its capacity is varied the ratio of the transmission is varied, and also comprising a section of fixed capacity which may be driven alternately to said other section, and means for effecting a positive direct connection between said shafts.

9. In a power transmission, a driving member, a driven member, fluid-propelling means actuated by said driving member, a first fluid-propelled means driven by fluid from said fluid-propelling means for a reverse drive, a second fluid-propelled means driven by fluid from said fluid-propelling means actuating the driven member in a forward, indirect drive of comparatively low speeds, a third fluid-propelled means driven by fluid from said fluid-propelling means actuating the driven member in a forward, indirect drive of comparatively high speed, means for controlling the flow of fluid to said second fluid-propelled means below a certain speed of the driven member or to said third fluid-propelled means above that certain speed of the driven member, means for connecting said driving and driven members for a direct drive effective during the functioning of said third fluid-propelled means, means actuated by fluid discharged from said third fluid-propelled means for bringing about the connecting of said driving and driven members for said direct drive, and means actuated by the fluid discharged from said second fluid-propelled means for causing the discontinuing of said direct drive.

10. A power transmission comprising a driving member, a driven member, fluid propelling means actuated by said driving member, fluid-propelled means actuating said driven member, operative connection between said fluid-propelling means and said fluid-propelled means for circulation of operating fluid in a reverse drive, in a forward variable indirect low drive, in a forward indirect high drive and in direct drive, clutch means for connecting said driving and driven members in the direct drive, means shifting the clutch in one direction for the direct drive and in the opposite direction for the indirect drive, means responsive to the speed of the driven member for varying the ratio of speeds of said driving and driven members, as demanded by the varying conditions of load and speed, through varying the ratio of effective capacity of the fluid-propelling and fluid-propelled means, drive-setting means for setting the transmission for a neutral condition, for the reverse drive and for the forward drives, these latter forward drives functioning responsively to said means responsive to the speed of the driven member, and also for a manually controlled, auxiliary direct drive, a neutral port in said drive-setting means, a foot-controlled operating valve for directing the operating fluid to said drive-setting means or to a neutral port, means sealing this latter neutral port during the direct drive, means rotating said foot-controlled operating valve during the manually controlled direct drive from its position of rest to the position imparted to it during the operation of the vehicle and thus diverting the operating fluid from this last neutral, now sealed, port to said drive-setting means for its inactive discharge through the neutral port of this latter drive-setting means.

11. In a power transmission device, a driving member, a driven member, a first means actuated by said driving member for actuating said driven member so as to cause it to rotate in the same direction as the driving member, a second means actuated by said driving member for actuating said driven member so as to cause it to rotate in the opposite direction, connecting means for directly connecting said driving and driven members, means responsive to the speed of the driven member, when this latter driven member is actuated by said first means actuated by said driving member, for varying the speed ratio between said driving and driven members in accordance with the requirements of given conditions of speed and load, and also for causing said connecting means to effect a direct drive connection between said driving and driven members when this latter driven member reaches a certain predetermined speed, manually controlled drive-setting means adapted for selective setting in a position in which it effects an operative connection between said driving member and said first actuated means, or into a position in which it effects an operative connection between said driving member and said second actuated means while at the same time rendering said speed-responsive means inactive, or into a position in which said driving member idles, or into a position in which it causes the effecting of an auxiliary direct drive, control means for simultaneously controlling the power input into the driving member and the transmission of power therefrom to said driven member, means for causing said control means to return to its position of rest when released, and means for disrupting the direct drive connection between said driving and driven members when this latter control means is suddenly allowed to return to said position of rest.

12. In a power transmission device, a driving member, fluid-propelling means actuated by said driving member, a driven member, fluid-propelled means driven by fluid from said fluid-propelling means in a reverse drive, fluid-propelled means driven by fluid from said fluid-propelling means actuating said driven member in a forward drive, means for varying the ratio of effective volume of said fluid-propelling and fluid-propelled means for varying the ratio of speed between said driving and driven members, operative connection between said fluid-propelling means and fluid-propelled means for the circulation of operating fluid in said reverse drive and forward drive, a drive-setting valve intermediate said fluid-propelling means and fluid-propelled means for directing the operating fluid to a neutral port for its inactive discharge, or to said fluid-propelled means for the reverse drive, or to said fluid-propelled means for the forward drive, an operating valve intermediate said fluid-propelling means and said drive-setting valve, a system of by-passes in the drive-setting valve and in the operating valve arranged to become so interrelated when said operating valve is sufficiently revolved, in the process of vehicle operation, as to constitute an adequate return passageway for the operating fluid evacuated from the forward-drive-fluid-propelled means during the reverse drive, and an adequate return passageway for the operating fluid evacuated from the reverse-drive-fluid-propelled means during the forward drive, and, conversely, as to constitute an inadequate return passageway and to obstruct the free flow of the operating fluid when said operating valve is allowed to return to its position of rest, this latter feature resulting in a braking effect upon the driven member.

13. In a power transmission device, a driving member, fluid-propelling means actuated by said driving member, a driven member, fluid-propelled means actuating said driven member in a reverse drive, fluid-propelled means actuating said driven member in forward indirect and direct drives, an operative connection between said fluid-propelling means and fluid-propelled means for the circulation of operating fluid, means responsive to the speed of the driven member for varying the ratio of speeds between said driving and driven members as demanded by conditions of load and speed, manually operated valve means for regulating the flow of the operating fluid from the fluid-propelling means to the fluid-propelled means for establishing said reverse drive and said forward indirect and direct drives, a clutch for connecting the driving and driven members in the direct drive, a handlever, a shaft intermediate said handlever and said manually operated valve means, a mechanism responsive, through the operating fluid, to the means responsive to the speed of the driven member, for shifting said clutch for effecting the direct drive at a definite speed of this latter driven member, cam means, operated through said handlever and said shaft, in operative relation through a system of levers with said means for shifting the clutch, and means, derived from the contour of said cam means, for manually effecting the direct drive through said handlever.

14. In a variable power transmission device, a driving member, fluid-propelling means actuated by said driving member, a driven member, fluid-propelled means driven by fluid from said fluid-propelling means actuating said driven member in a reverse drive, fluid-propelled means driven by fluid from said fluid-propelling means actuating said driven member in a forward indirect and direct drive, means responsive to the speed of the driven member for varying the ratio of speed between said driving and driven members as demanded by the varying load and speed, an operative connection between said fluid-propelling means and said fluid-propelled means for the circulation of operating fluid for said reverse drive and for said indirect and direct drive, this latter indirect and direct drive being responsive to said means responsive to the speed of the driven member, a handlever, a dial for the positioning of said handlever for said reverse drive, for a neutral condition of the transmission, for said indirect and direct drive responsive to the means responsive to the speed of the driven member and also for a manually effected, auxiliary direct drive, a drive-setting valve, in the path of said operative connection between said fluid-propelling means and said fluid-propelled means, for directing the operating fluid either to a neutral port or to said fluid-propelled means concerned in the reverse drive, or to said fluid-propelled means concerned in said indirect and direct drive, an operating valve intermediate said fluid-propelling means and said drive-setting valve for directing the operating fluid either to a neutral port for its inactive discharge or to said drive-setting valve, a footpedal for the actuating of said operating valve, a shaft intermediate said handlever and said drive-setting valve for imparting to this latter drive-setting valve a position corresponding to the position of said handlever on said dial, a clutch effecting the direct drive, a first lever means, in operative connection with said clutch effecting the direct drive and in operative relation with said neutral port in the operating valve, sealing this latter port during the direct drive effected by manual means and during the direct drive of said indirect and direct drive responsive to the means responsive to the speed of the driven member, a second lever means, in operative connection with said first lever means and in operative relation with the operating valve, for revolving the latter operating valve to a position wherein the operating fluid will be diverted from said neutral, sealed port in the operating valve to said drive-setting valve, with or without the application of force to said footpedal for actuating said operating valve.

15. In a variable transmission device, a driving member, fluid-propelling means actuated by said driving member, a driven member, a fluid-pressure gauge responsive to the speed of the driven member, fluid-propelled means driven by fluid from said fluid-propelling means actuating said driven member in a reverse drive, fluid-propelled means driven by fluid from said fluid-propelling means actuating said driven member in a forward indirect and direct drive responsive to said fluid-pressure gauge, operative connection between said fluid-propelling means and both said fluid-propelled means for the circulation of operating fluid, drive-setting means comprising a handlever, a shaft and a valve in the path of said operative connection between said fluid-propelling means and both said fluid-propelled means for directing the operating fluid in said reverse drive, in a neutral condition of the transmission, in said forward indirect and direct drive responsive to said fluid-pressure gauge, and also in a manually operated, auxiliary direct drive, an operating valve for directing the operating fluid from the fluid-propelling means either to a neutral port for its inactive discharge or to the valve of said drive-setting means, operative connection between said fluid-pressure gauge and said drive-setting means and means for suspending the functioning of said fluid-pressure gauge when said drive-setting means is set for the reverse drive.

16. In a power transmission device, a driving member, fluid-propelling means actuated by said driving member, a driven member, fluid-propelled means driven by fluid from said fluid-propelling means actuating said driven member, means for establishing a reverse drive, means for establishing a forward, automatically variable indirect drive and an automatically functioning direct drive, clutch means effecting said direct drive composed of a shiftable member and a non-shiftable member, and means for absorbing the pressure upon said shiftable member in the process of effecting the direct drive until this latter direct drive has been consummated.

17. A power transmission comprising a driving member, means actuated by said driving member for generating a flow of fluid, a driven member, means for receiving said fluid and thereby actuating said driven member, adjustable means for effecting a positive connection between said driving and driven members, and means operated by the fluid discharged from said fluid-receiving means for adjusting said adjustable means, under predetermined conditions, to effect said positive connection between said driving and driven members.

18. In a power transmission device of the fluid transmission type, a driving member, means actuated by said driving member for generating a flow of fluid, a driven member, means for receiving said fluid and thereby actuating said driven member, a fluid pressure gauge, means actuated by said driven member for supplying fluid to said fluid pressure gauge, whereby said gauge is responsive to the speed of said driven member, and means controlled by said fluid pressure gauge as it responds to the speed of said driven member for controlling the flow of fluid between said fluid flow generating device and said fluid receiving device so as to vary the ratio of transmission between the driving and driven members.

19. In a power transmission of the fluid type, a driving member, a driven member, an operative connection between said driving member and said driven member for the circulation of operating fluid, means, responsive to the speed of the driven member, regulating the flow of operating fluid from said driving member to said driven member for automatically varying the ratio of speed of these latter members as demanded by the load and speed of the vehicle, means for connecting said driving and driven members in a direct drive, the implementing of this direct drive being normally a function of said means responsive to the speed of the driven member, and auxiliary, mechanical means for manually effecting said direct drive.

20. In a power transmission, a driving member, fluid-propelling means actuated by said driving member, a driven member, fluid-propelled means driven by fluid from said fluid-propelling means for actuating said driven member, an operative connection between said fluid-propelling means and fluid-propelled means for the circulation of operating fluid, means, responsive to the speed of said driven member, for automatically varying the speed ratio of the transmission by controlling the flow of the operating fluid through said fluid-propelling means and fluid-propelled means, clutch means, comprising elements mounted on, and revolving with, said driving and driven members, adapted for interengagement to effect a direct connection between said driving and driven members, and means for automatically implementing said interengagement, when the speed of these latter members is substantially the same, said interengagement being a function of said means responsive to the speed of the driven member.

21. In a power transmission device, in combination, a driving member, fluid-propelling means actuated by said driving member, a driven member, fluid-propelled means driven by fluid from said fluid-propelling means actuating said driven member in a reverse drive, fluid-propelled means driven by fluid from said fluid-propelling means actuating said driven member in a forward variable indirect drive of comparatively low speed, fluid-propelled means driven by fluid from said fluid-propelling means actuating said driven member in a forward fluid indirect drive of comparatively high speed combined with a mechanical direct drive, clutch means for effecting a connection between said driving and driven members for this latter mechanical direct drive, means, responsive to the speed of the driven member, establishing a variable ratio between the speeds of the driving and driven members as demanded by the varying speed and load of the vehicle, an operative connection between said fluid-propelling means and the various said fluid-propelled means for the circulation of the operating fluid, an operating valve, in the path of this latter operative connection, for regulating the flow of the operating fluid between said fluid-propelling means and said fluid-propelled means, a gas throttle, a pedal for the joint controlling of said operating valve and said gas throttle, a drive-setting valve situated between said operating valve and said fluid-propelled means for directing the operating fluid either to a neutral port resulting, when the gas throttle is actuated, in an accelerated idling of the driving member, or to said fluid-propelled means actuating said driven member in said reverse drive, or to said fluid-propelled means actuating said driven member in the various said forward drives, or to a neutral port for its inactive discharge during an auxiliary direct drive, a dial disclosing the position of said drive-setting valve, a handlever, movable along this latter dial, for positioning said drive-setting valve for the reverse drive, or for a neutral condition of the transmission, or for the various said forward drives, or for said auxiliary direct drive, a shaft intermediate said handlever and said drive-setting valve, a cam rotatable through said shaft, a system of levers intermediate this latter cam and said clutch means for effecting a connection for the mechanical direct drive, and means, derived from the contour of said cam, in association with said system of levers, for manually effecting the auxiliary direct drive and for maintaining said clutch means in disengaged condition during the reverse drive and during the neutral condition of the transmission.

ISAAC B. HOROWITZ.